(12) United States Patent
Rossi et al.

(10) Patent No.: US 11,163,803 B2
(45) Date of Patent: Nov. 2, 2021

(54) HIGHER-ORDER GRAPH CLUSTERING

(71) Applicant: Adobe Inc., San Jose, CA (US)

(72) Inventors: Ryan A. Rossi, Mountain View, CA (US); Eunyee Koh, San Jose, CA (US); Anup Bandigadi Rao, San Jose, CA (US); Aldo Gael Carranza, Stanford, CA (US)

(73) Assignee: Adobe Inc., San Jose, CA (US)

(*) Notice: Subject to any disclaimer, the term of this patent is extended or adjusted under 35 U.S.C. 154(b) by 255 days.

(21) Appl. No.: 16/397,839

(22) Filed: Apr. 29, 2019

(65) Prior Publication Data

US 2020/0342006 A1 Oct. 29, 2020

(51) Int. Cl.
*G06F 16/28* (2019.01)
*G06F 16/22* (2019.01)

(52) U.S. Cl.
CPC ........ *G06F 16/285* (2019.01); *G06F 16/2237* (2019.01)

(58) Field of Classification Search
CPC ...... G06F 16/9024; G06F 16/35; G06F 16/28; G06F 16/285; G06F 16/2237
See application file for complete search history.

(56) References Cited

U.S. PATENT DOCUMENTS

2016/0154895 A1* 6/2016 Koutra ................ G06N 5/048
706/46

OTHER PUBLICATIONS

Lee et al., "PathRank: A Novel Node Ranking Measure on a Heterogeneous Graph for Recommender Systems", 2012, ACM. (Year: 2012).*
Liu et al., "Heterogeneous Graph Neural Networks for Malicious Account Detection", Oct. 26, 2018, ACM. (Year: 2018).*
Acar,"All-at-once Optimization for Coupled Matrix and Tensor Factorizations", May 17, 2011, 9 pages.
Ahmed,"Efficient Graphlet Counting for Large Networks", 2015 IEEE International Conference on Data Mining, Nov. 2015, 10 pages.
Ahmed,"Estimation of Local Subgraph Counts", Dec. 2016, 10 pages.

(Continued)

*Primary Examiner* — Apu M Mofiz
*Assistant Examiner* — Sheryl L Holland
(74) *Attorney, Agent, or Firm* — FIG. 1 Patents

(57) ABSTRACT

In implementations of higher-order graph clustering and embedding, a computing device receives a heterogeneous graph representing a network. The heterogeneous graph includes nodes that each represent a network entity and edges that each represent an association between two of the nodes in the heterogeneous graph. To preserve node-type and edge-type information, a typed graphlet is implemented to capture a connectivity pattern and the types of the nodes and edges. The computing device determines a frequency of the typed graphlet in the graph and derives a weighted typed graphlet matrix to sort graph nodes. Sorted nodes are subsequently analyzed to identify node clusters having a minimum typed graphlet conductance score. The computing device is further implemented to determine a higher-order network embedding for each of the nodes in the graph using the typed graphlet matrix, which can then be concatenated into a matrix representation of the network.

20 Claims, 7 Drawing Sheets

(56) References Cited

OTHER PUBLICATIONS

Ahmed,"Exact and Estimation of Local Edge-centric Graphlet Counts", JMLR: Workshop and Conference Proceedings 53:1, Jan. 2016, 16 pages.
Ahmed,"Graphlet Decomposition: Framework, Algorithms, and Applications", Feb. 15, 2016, 32 pages.
Ahmed,"Learning Role-based Graph Embeddings", Jul. 2, 2018, 8 pages.
Albert,"Statistical mechanics of complex networks", Jan. 2002, pp. 47-97.
Almeida,"Is there a best quality metric for graph clusters?", Sep. 5, 2011, 16 pages.
Alon,"Biological Networks: The Tinkerer as an Engineer", Oct. 2003, 3 pages.
Alon,"On the Edge-Expansion of Graphs", Jun. 1997, 9 pages.
Arenas,"Motif-based communities in complex networks", Sep. 29, 2007, 10 pages.
Balasubramanyan,"Block-LDA: Jointly modeling entity-annotated text and entity-entity links", Apr. 2011, 13 pages.
Bassett,"Small-World Brain Networks", Jan. 2007, 13 pages.
Batagelj,"Indirect Blockmodeling of 3-Way Networks", Jan. 2007, 10 pages.
Benson,"Higher-order organization of complex networks", Dec. 26, 2016, 76 pages.
Blondel,"Fast unfolding of communities in large networks", Jul. 25, 2008, 12 pages.
Boldi,"Layered Label Propagation: A Multi-Resolution Coordinate-Free Ordering for Compressing Social Networks", Oct. 14, 2011, 13 pages.
Boldi,"The WebGraph Framework I: Compression Techniques", May 2004, pp. 595-602.
Bothorel,"Clustering attributed graphs: models, measures and methods", Jan. 9, 2015, 40 pages.
Buehrer,"A Scalable Pattern Mining Approach to Web Graph Compression with Communities", Feb. 12, 2008, pp. 95-106.
Bullmore,"Complex brain networks: graph theoretical analysis of structural and functional systems", Mar. 2009, 14 pages.
Chierichetti,"On Compressing Social Networks", Jun. 28, 2009, 9 pages.
Chung,"Laplacians of graphs and Cheeger inequalities", Jan. 1993, 17 pages.
Chung,"Spectral Graph Theory", Jun. 1994, 214 pages.
Chung,"Weighted Graph Laplacians and Isoperimetric Inequalities", Oct. 2000, 18 pages.
Coa,"GraRep: Learning Graph Representations with Global Structural Information", Oct. 23, 2015, 10 pages.
Combe,"Combining relations and text in scientific network clustering", Sep. 8, 2012, 7 pages.
Cook,"The Complexity of Theorem-Proving Procedures", May 1971, 7 pages.
Coscia,"A Classification for Community Discovery Methods in Complex Networks", Jun. 15, 2012, 32 pages.
Danon,"Comparing community structure identification", Oct. 18, 2005, 10 pages.
Dhillon,"Coclustering documents and words using Bipartite Spectral Graph Partitioning", May 2001, 6 pages.
Doreian,"Generalized Blockmodeling of Two-mode Network Data", Sep. 27, 2003, 20 pages.
Eagle,"Reality mining: sensing complex social systems", May 2006, pp. 255-268.
Erdos,"On Chromatic Number of Graphs and Set-Systems", Mar. 1966, 39 pages.
Felzenszwalb,"Efficient Graph-Based Image Segmentation", International Journal of Computer Vision 59(2), Sep. 17, 2003, 16 pages.
Fortunato,"Community detection in graphs", Jan. 25, 2010, 103 pages.
Fortunato,"Community detection in networks: A user guide", Jul. 30, 2016, 43 pages.
Fortunato,"Resolution limit in community detection", Jul. 14, 2006, 8 pages.
Gaertler,"Clustering", In: Brandes U., Erlebach T. (eds) Network Analysis. Lecture Notes in Computer Science, vol. 3418. Springer, Berlin, Heidelberg (2005), 2005, pp. 178-215.
Ge,"Joint Cluster Analysis of Attribute Data and Relationship Data: The Connected k-Center Problem, Algorithms and Applications", Jul. 2008, 36 pages.
Giles,"The Future of CiteSeer: CiteSeerx", Jan. 2006, 1 page.
Girvan,"Community structure in social and biological networks", Dec. 7, 2001, 8 pages.
Gleich,"Neighborhoods are good communities", Nov. 30, 2011, 11 pages.
Gleich,"Vertex Neighborhoods, Low Conductance Cuts, and Good Seeds for Local Community Methods", Aug. 12, 2012, pp. 597-605.
Golub,"Matrix Computations", 4th Ed., Computer Assisted Mechanics and Engineering Sciences, Johns Hopkins University Press, US, 2013, 780 pages.
Grover,"node2vec: Scalable Feature Learning for Networks", Jul. 3, 2016, 10 pages.
Harenberg,"Community detection in large-scale networks: a survey and empirical evaluation", Nov. 2014, pp. 426-439.
Hendrickson,"An improved spectral graph partitioning algorithm for mapping parallel computations", Mar. 1995, pp. 452-469.
Hoory,"Expander Graphs and Their Applications", Aug. 7, 2008, pp. 439-561.
Kannan,"On Clusterings: Good, Bad and Spectral", Journal of the ACM, vol. 51, No. 3, May 2004, pp. 497-515.
Karande,"Speeding up Algorithms on Compressed Web Graphs", Feb. 2009, 10 pages.
Khuller,"On Finding Dense Subgraphs", Jul. 2009, 19 pages.
Kong,"Inferring Anchor Links across Multiple Heterogeneous Social Networks", Oct. 2013, pp. 179-188.
Lancichinetti,"Community detection algorithms: a comparative analysis", Sep. 16, 2010, 12 pages.
Leighton,"Multicommodity Max-Flow Min-Cut Theorems and Their Use in Designing Approximation Algorithms", Nov. 1999, pp. 787-832.
Leskovec,"Empirical Comparison of Algorithms for Network Community Detection", Apr. 20, 2010, 11 pages.
Liakos,"Pushing the Envelope in Graph Compression", Nov. 2014, 11 pages.
Liben-Nowell,"The link prediction problem for social networks", Jan. 8, 2004, 19 pages.
Lin,"Network Motif Discovery: A GPU Approach", Feb. 2017, 12 pages.
Liu,"A Framework for Community Detection in Heterogeneous Multi-Relational Networks", Jul. 15, 2014, 27 pages.
Liu,"Topic-Link LDA: Joint Models of Topic and Author Community", Jun. 2009, 8 pages.
Long,"Spectral Clustering for Multi-type Relational Data", Jun. 2006, 8 pages.
Malliaros,"Clustering and Community Detection in Directed Networks: A Survey", Aug. 5, 2013, 86 pages.
Masoudi-Nejad,"Building blocks of biological networks: a review on major network motif discovery algorithms", Mar. 2012, pp. 164-174.
McPherson,"Birds of a Feather: Homophily in Social Networks", Aug. 2001, pp. 415-444.
Milo,"Network Motifs: Simple Building Blocks of Complex Networks", Oct. 2002, 4 pages.
Neville,"Clustering Relational Data Using Attribute and Link Information", Aug. 2003, 6 pages.
Newman,"Communities, modules and large-scale structure in networks", Jan. 2012, pp. 25-31.
Newman,"Finding and evaluating community structure in networks", Feb. 2004, 15 pages.
Ng,"On Spectral Clustering: Analysis and an Algorithm", Apr. 2002, 8 pages.
Paranjap,"Motifs in Temporal Networks", Dec. 29, 2016, 10 pages.
Perozzi,"DeepWalk: Online Learning of Social Representations", Jun. 27, 2014, 10 pages.

(56) References Cited

OTHER PUBLICATIONS

Przulj,"Modeling Interactome: Scale-Free or Geometric?", Jul. 2004, 53 pages.
Raghavan,"Near linear time algorithm to detect community structures in large-scale networks", Sep. 19, 2007, 12 pages.
Rossi,"A Multi-Level Approach for Evaluating Internet Topology Generators", May 2013, 9 pages.
Rossi,"An Interactive Data Repository with Visual Analytics", Feb. 2016, 5 pages.
Rossi,"Coloring Large Complex Networks", Aug. 26, 2014, 52 pages.
Rossi,"Deep Inductive Network Representation Learning", Jan. 2018, 8 pages.
Rossi,"Estimation of Graphlet Counts in Massive Networks", May 2018, 14 pages.
Rossi,"Estimation of Graphlet Statistics", Feb. 28, 2017, 14 pages.
Rossi,"GraphZIP: a clique-based sparse graph compression method", Feb. 2018, 14 pages.
Rossi,"Higher-order Network Representation Learning", Apr. 2018, 2 pages.
Rossi,"HONE: Higher-Order Network Embeddings", May 30, 2018, 10 pages.
Rossi,"Interactive Higher-order Network Analysis", Jan. 2018, 6 pages.
Rossi,"Leveraging Multiple GPUs and CPUs for Graphlet Counting in Large Networks", Oct. 2016, 10 pages.
Rossi,"Parallel Collective Factorization for Modeling Large Heterogeneous Networks", Dec. 2016, 30 pages.
Rossi,"Parallel Maximum Clique Algorithms with Applications to Network Analysis and Storage", Dec. 26, 2013, 11 pages.
Rossi,"Role Discovery in Networks", Nov. 3, 2016, 20 pages.
Rossi,"The Network Data Repository with Interactive Graph Analytics and Visualization", http://networkrepository.com/, Mar. 4, 2015, pp. 4292-4293.
Schaeffer,"Graph Clustering", Aug. 2007, pp. 27-64.
Schweitzer,"Economic Networks: The New Challenges", Jul. 24, 2009, pp. 422-425.
Shen-Orr,"Network motifs in the transcriptional regulation network of *Escherichia coli*", May 2002, pp. 64-68.
Shervashidze,"Weisfeiler-Lehman Graph Kernels", Sep. 2011, 23 pages.
Shewchuk,"Allow Me to Introduce Spectral and Isoperimetric Graph Partitioning", Apr. 16, 2016, 69 pages.
Shi,"A Survey of Heterogeneous Information Network Analysis", Nov. 16, 2015, 45 pages.
Shi,"Normalized Cuts and Image Segmentation", IEEE Transactions on Pattern Analysis and Machine Intelligence, vol. 22, No. 8, Aug. 2000, Aug. 2000, pp. 888-905.
Shin,"CoreScope: Graph Mining Using k-Core Analysis—Patterns, Anomalies and Algorithms", Dec. 2016, 11 pages.
Sima,"On the NP-Completeness of Some Graph Cluster Measures", Jun. 29, 2005, 9 pages.
Simon,"Partitioning of Unstructured Problems for Parallel Processing", NAS Systems Division, Applied Research Branch, NASA Ames Research Center, Feb. 1991, 25 pages.
Steinhaeuser,"Community Detection in a Large Real-World Social Network", Apr. 2008, 8 pages.
Sun,"Mining Heterogeneous Information Networks: A Structural Analysis Approach", Apr. 2013, pp. 20-28.
Sun,"Ranking-Based Clustering of Heterogeneous Information Networks with Star Network Schema", Jul. 2009, 9 pages.
Tang,"LINE: Large-scale Information Network Embedding", Mar. 12, 2015, 11 pages.
Trevisan,"Lecture Notes on Expansion, Sparsest Cut, and Spectral Graph Theory", Aug. 23, 2014, 81 pages.
Tsourakakis,"Scalable motif-aware graph clustering", Feb. 4, 2017, 17 pages.
Verma,"A Comparison of Spectral Clustering Algorithms", Jul. 2003, 18 pages.
Vishwanathan,"Graph Kernels", Apr. 2010, pp. 1201-1242.
Voevodski,"Finding local communities in protein networks", Sep. 18, 2009, 14 pages.
Wang,"Cascade-based attack vulnerability on the US power grid", Feb. 2009, 5 pages.
Xu,"A Model-based Approach to Attributed Graph Clustering", May 2012, 12 pages.
Yin,"Exploring Social Tagging Graph for Web Object Classification", Jun. 2009, 9 pages.
Yin,"Higher-order clustering in networks", Jan. 5, 2018, 11 pages.
Yu,"Personalized Entity Recommendation: A Heterogeneous Information Network Approach", Feb. 2014, 10 pages.
Zhou,"Graph Clustering Based on Structural/Attribute Similarities", Aug. 2009, 12 pages.
Zhu,"Semi-Supervised Learning Using Gaussian Fields and Harmonic Functions", ICML 2003, Aug. 2003, 8 pages.

\* cited by examiner

HIGHER-ORDER GRAPH CLUSTERING

BACKGROUND

Different network types can be represented as graphs, such as Internet-related networks, scientific research networks, human disease and epidemiology networks, political blog networks, power grid networks, protein interaction modeling networks, communication analysis between members and groups in social networks, networks for advertising and marketing analytics, networks pertaining to the study of ecosystems, and so forth. In these graph representations, network entities are represented as nodes, and relationships between the entities are represented as edges between different ones of the nodes, which may also be referred to as node associations. In order to reveal higher-order organization of these largescale graphs, nodes can be grouped into components (i.e., clusterings) based on their fundamental structural patterns, which in turn reveals how the underlying network components interact. For example, in an Internet-related network, clustering nodes may be used to predict browsing session identifiers that belong to a same user, devices that belong to a same business or organization, IP addresses associated with a common Internet Service Provider or Autonomous System, web pages that correspond to a common topic, and so forth.

Conventional approaches for large-scale graph analysis, however, are not able to function properly when dealing with heterogeneous graphs, where nodes and edges have different types (e.g., where nodes of a graph represent different entity types, such as users, IP addresses, web pages, locations, and so forth). Rather, conventional approaches perform analysis on homogenous graph data (e.g., where nodes and edges are of a single type) and as such are designed to disregard node types and edge types, or to model all nodes and edges as being of a single type. For conventional approaches that are able to consider higher-order connectivity patterns of homogeneous graphs, these approaches are still limited to considering motifs or graphlets without regard to the type structure of a motif or graphlet. Thus, conventional approaches are unable to identify variations in type connectivity patterns for nodes of a graph and consequently cluster dissimilar nodes as being similar.

SUMMARY

Higher-order network clustering and embedding in a digital medium environment is described. To reveal higher-order organization of a network, a computing device receives interconnected data in the form of a heterogeneous graph representing the network. The heterogeneous graph includes nodes that each represent an entity in the network and node associations that each represent an edge between two of the nodes in the heterogeneous graph. In contrast to homogeneous graphs, which include only a single node and edge type, heterogeneous graphs are capable of representing different types of nodes and different types of edges in a manner that preserves type information for each node and edge, thereby providing a more accurate representation of real-world networks. For example, in an online social media network, users may establish a profile to friend or follow other user profiles, share and tag others in pictures, purchase items through an online interface, recommend items to others, and so forth. Thus, the social media network may be modeled as a graph having many different node types representing different entities of the social media network, such as user profiles, photos, and items.

Interactions between the various entities may be modeled as edges in the graph, and associated with a particular type based on the interaction. For instance, interactions among the various nodes of the previous example may be grouped according to four different edge types: "follows" (user-follows-user); "tags" (user-tags-photo); "share" (user-shares-photo and user-shares-item); and purchase (user-purchases-item). Conversely, a homogenous representation of the same social media network would be limited to representing a single node type and a single edge type, such as where edges are only users, where edges are limited to user-follows-user, and where photos, items, and their related interactions are disregarded. Although described with respect to a social media network with three node types and four edge types, the techniques described herein are applicable to a graph representation of a network having any number of node types and edge types.

Thus, the heterogeneous graph can be representative of a complex or dynamic network, such as a social network, tech-based network, web-based network, or any other type of network data graph. As a network and its corresponding heterogeneous graph develop over time, induced subgraphs, or patterns, arise and can be identified using the techniques described herein. To preserve node-type and edge-type information, the techniques described herein leverage the concept of a typed graphlet, which explicitly captures both a particular connectivity pattern of interest as well as the particular type(s) of the nodes and edges.

The computing device implements a network clustering module that determines the frequency of a typed graphlet of interest for every edge in the graph. Using the typed graphlet frequency, the network clustering module derives a typed graphlet adjacency matrix for the typed graphlet. In implementations, each instance of the typed graphlet is represented as a nonzero value in the typed graphlet adjacency matrix. In this manner, the typed graphlet adjacency matrix may be weighted to reflect the typed graphlet frequency in the heterogeneous graph. In some implementations, the typed graphlet adjacency matrix may be configured as a sparse matrix, thereby reducing an amount of computational resources that would be otherwise required to process and store a typed graphlet adjacency matrix configured as a dense matrix.

The network clustering module then derives a typed graphlet Laplacian matrix from the typed graphlet adjacency matrix, which is used to sort nodes of the heterogeneous graph. To do so, the network clustering module computes eigenvectors corresponding to d-dimensional smallest eigenvalues of the typed graphlet Laplacian matrix and sorts the typed graphlet Laplacian matrix based on the second-smallest of the computed eigenvectors. The components of the eigenvector provide an ordering of the nodes in nested sets, which are then analyzed based on their respective typed graphlet conductance scores. A nested node set having a minimum typed graphlet conductance score is output as a cluster, which represents a clustering of nodes and edges that best preserve the typed graphlet of interest. In some implementations, the nodes of the cluster, or partition, can be removed from the heterogeneous graph such that the graph can be re-analyzed to identify additional clusters, based on the same or a different typed graphlet.

In addition to identifying clusters, the computing device is configured to derive higher-order node embeddings based on the typed graphlet Laplacian matrix. To do so, the computing device implements a network embedding module that derives higher-order network embeddings by correlating a mapping of the heterogeneous graph nodes to d-dimensional features. The network embedding module then concatenates the higher-order network embeddings into a typed graphlet embedding matrix, which is useable to identify subgraph patterns of a network. As described herein, a higher-order network embedding of a node in a graph may also be referred to as a features, representation, or encoding of the node in the graph. In implementations, the network embedding module can determine a network representation from machine learning applied to the higher-order network embeddings. Further, a network model of a network can be generated based on the higher-order network embeddings of the nodes in the graph, and the network model is then usable to model entities in the network. For example, a system can utilize the network model to identify clusters of the entities in the network based on dependencies and connectivity patterns among the nodes in the graph that represents the network.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
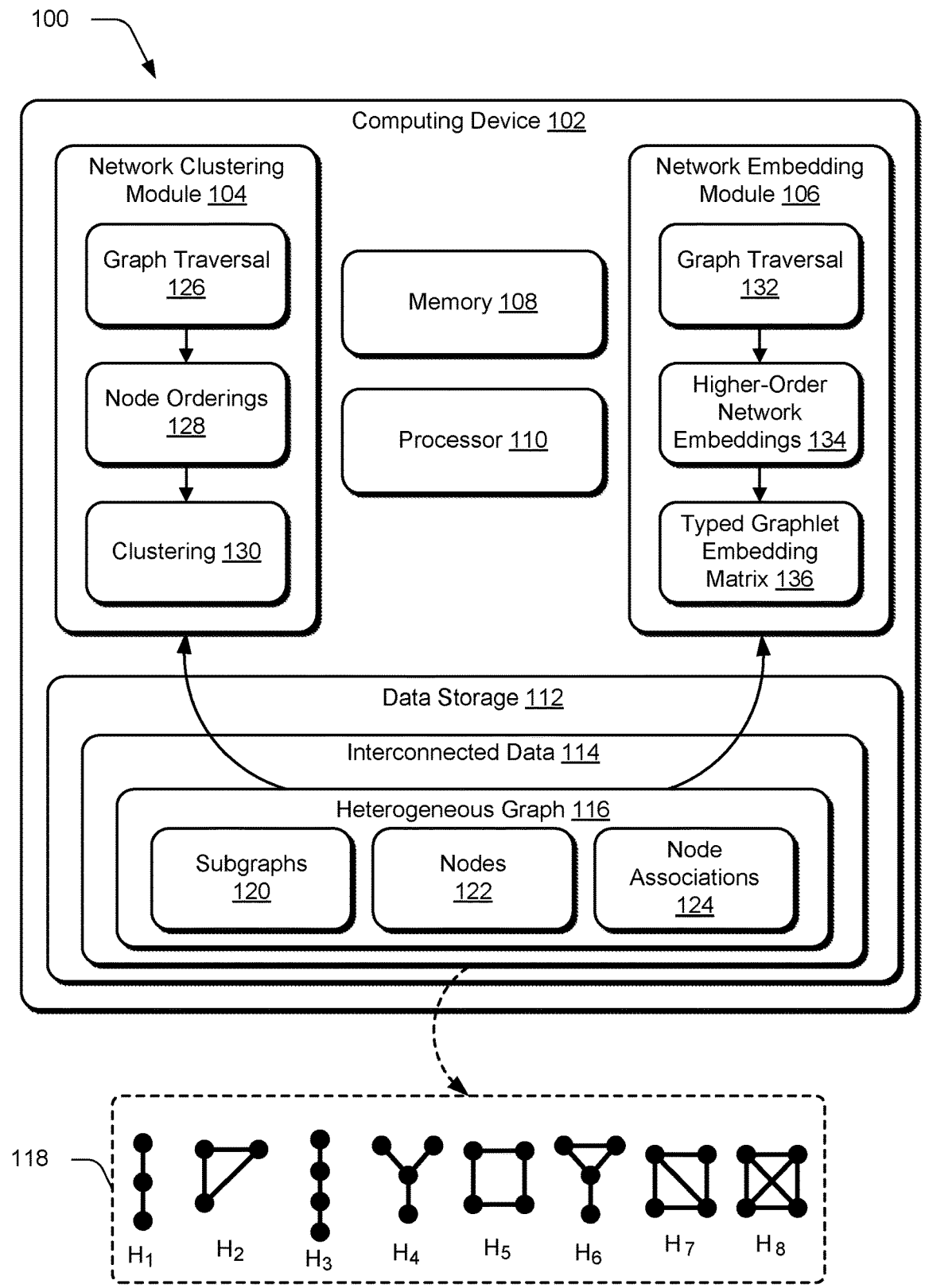
FIG. 1 is an illustration of an environment in an example implementation that is operable to employ the higher-order network clustering and embedding techniques described herein.

Techniques for higher-order network clustering are described, along with techniques for learning higher-order network embeddings of nodes in a heterogeneous graph representation of a network. As described herein, the heterogeneous graph differs from a homogeneous graph in that various nodes can be associated with different node types and various node associations can be associated with different node association types. Using the techniques described herein, the higher-order network clustering can be applied to heterogeneous graphs by leveraging typed graphlets, which explicitly incorporate heterogeneous higher-order information of graph nodes and edges. Higher-order network clusterings can then be identified based on a clustering's typed graphlet conductance to return a clustering that achieves a bipartition of the heterogeneous graph that minimizes the number of instances of the typed graphlet that are cut and is balanced in terms of the total graphlet degree contribution of all instances of the typed graphlet on each partition. Additionally, using the techniques described herein, the higher-order network embeddings can be determined based on induced subgraph patterns that preserve type information for the various nodes and node associations, which are also referred to as typed network motifs or typed graphlets. As described herein, a graph representation can be used to model any type of network and relational data.

Conventional approaches to modeling a network as a graph focus on simple homogeneous graphs with a single node type and a single edge type. However, such a simple representation does not accurately capture networks including nodes and edges of different types, such as in Internet-related networks, in scientific research networks, in human disease and epidemiology networks, in political blog networks, in power grid networks, in protein interaction modeling networks, in communication analysis between members and groups in social networks, in advertising and marketing analytics, in the study of ecosystems, and so forth. The node associations, or edges, between the nodes of a graph may represent any form of node association, such as citations, collaborations, associations, functions, communications, co-locations, shared mechanisms, explicit or implicit relationships, purchases, and the like. Significantly, edges in a graph are not limited to being of a single type. Rather, different edges may be associated with different edge types, such that the heterogeneous graph includes explicit relationship edges, implicit relationship edges, purchase edges, and communication edges. In some implementations, the heterogeneous graph may be directed, such that each edge in the heterogeneous graph is associated with a direction in which the two nodes connected by the edge. A directed heterogeneous graph is contrasted with an undirected heterogeneous graph, where each edge is represented as being bidirectional between its connected nodes. In this manner, modeling a network as a heterogeneous graph provides a representation of an overall flow of data in a complex or dynamic network.

A network model can be generated based on the learned higher-order network embeddings of the nodes in a graph that represents the network, and the network model is usable by a recommendation system, for example, to model clusterings of entities in the network. For instance, in recommendation systems with users who are associated to other entities (e.g., items, events, pages, groups, users, locations, restaurants, businesses, etc.) that are being recommended, the users (nodes) are linked (associated) to the entities, which can be modeled using the techniques described herein, thus significantly improving prediction analytics. In a network, "clusters" of the network entities represent node and edge connectivity patterns, such as hub/star-center nodes, star-edge nodes, near-cliques, and/or bridge nodes connecting different regions of the graph. In this regard, two nodes belong to the same cluster if they are structurally similar with respect to their general connectivity and induced subgraph patterns.

When dealing with heterogeneous graphs, because nodes and edges can be of many different types, explicitly modeling the node and edge types is crucial to properly represent a network. Although described herein with respect to "type", nodes and edges may be identified and differentiated from each other by "label", "color", attribute value, and so forth. Thus, reference to a "node type" may also refer to a "node label", a "node color", a "node attribute", and the like. Similarly, reference to an "edge type" may also refer to an "edge label", an "edge color", an "edge attribute", and so forth. To account for these different node and edge types, the techniques described herein use the concept of typed graphlets, which generalize the notion of graphlets for homogeneous networks to rich heterogeneous networks that are able to capture the higher-order typed connectivity patterns of heterogeneous networks.

To model a rich heterogeneous network, a computing device receives and maintains interconnected data in the form of a heterogeneous graph that represents the network, along with information describing the respective different types of nodes and edges in the graph. For a given typed graphlet, the computing device implements a network clustering module that determines a frequency of the typed graphlet for every edge in the heterogeneous graph. Using the typed graphlet frequency, the network clustering module derives a typed graphlet adjacency matrix for the typed graphlet.

The network clustering module then derives a typed graphlet Laplacian matrix from the typed graphlet adjacency matrix, which is used to sort nodes of the heterogeneous graph. To do so, the network clustering module computes eigenvectors corresponding to d-dimensional smallest eigenvalues of the typed graphlet Laplacian matrix and sorts the typed graphlet Laplacian matrix based on the second-smallest of the computed eigenvectors. The components of the eigenvector provide an ordering of the nodes in nested sets, which are then analyzed based on their respective typed graphlet conductance scores. A nested node set having a minimum typed graphlet conductance score is output as a cluster, which represents a clustering of nodes and edges that best preserve the typed graphlet of interest. In some implementations, the nodes of the cluster, or partition, can be removed from the heterogeneous graph such that the graph can be re-analyzed to identify additional clusters, based on the same or a different typed graphlet.

Using the techniques described herein, the network clustering module quantitatively improves clustering performance over conventional clustering approaches. In addition to network clustering, the node orderings generated by the network clustering module are beneficial for graph compression, which is useful in both reducing the amount of input/output traffic and speeding up existing algorithms by reducing an amount of work required to achieve a compression of acceptable quality, which rely on an ordering of vertices in the graph. In implementations, graph compression is particularly important when handling large data sets by reducing computational resources required to store and communicate graphs among different computing devices. As described in further detail below, the techniques described herein provide for improved compression in comparison to conventional graph compression techniques.

In addition to generating accurate network clusters, the techniques described herein are configured to derive higher-order network embeddings for each node in a heterogeneous graph based on the typed graphlet Laplacian matrix. To do so, the computing device implements a network embedding module that derives higher-order network embeddings by correlating a mapping of the heterogeneous graph nodes to d-dimensional features. The network embedding module then concatenates the higher-order network embeddings into a typed graphlet embedding matrix, which is useable to identify subgraph patterns of a network.

Using the techniques described herein, aspects of higher-order network clustering and embedding can be used as a central component of a recommendation system, and the feature-based representations learned from higher-order network embedding can be directly used to make better recommendations for delivering targeted content that is relevant to users, such as a group of similar users identified by a cluster. For example, in an implementation where the techniques described herein are used to determine recommendations for digital content in an online social media network, different node types (e.g., users, device, photos, items, web pages, etc.) and different edge types (e.g., user-follows-user, device-visits-page, user-uses-device, user-likes-photo, user-purchases-item, page-includes-item, etc.) can be taken into account when categorizing users as similar (i.e., as being clustered) and recommending digital content (e.g., photos, items, web pages, advertisements, and the like) to a user or group of users. In this manner, the techniques described herein account for varying types of nodes and edges in generating clusterings and embeddings and are thus more accurate than conventional approaches, which disregard differences among varying types of nodes and node associations.

Term Descriptions

As described herein, a "higher-order network embedding" of a node in a graph is determined as the features or encodings that represent and/or describe the network entity represented by the node in the graph. The higher-order network embeddings may be used or referred to interchangeably with the terms features, representations, and/or encodings as pertaining to the nodes of a graph. The higher-order network embeddings can be used for modeling user behavior, entity resolution, predictive modeling, and other graph-based machine learning tasks that depend on an appropriate representation of a complex network.

The "nodes" of a graph each represent an entity in a network. As described herein, each node in the graph may be specified as being of a certain type. For instance, a graph representation of a network may include any number of different entity types such as humans, neurons, routers, autonomous systems, web pages, devices, sensors, infrastructure, economies, vehicles, information in general, and so forth. In an example graph representation of an online social network, nodes of the graph may include user type nodes, device type nodes, IP address type nodes, web page type nodes, message type nodes, and so forth. Furthermore, in some implementations, nodes of the graph may be associated with different attributes and attribute values. In these implementations, an attribute value of a selected attribute can be used to specify the node's type. Although described herein with respect to "type", nodes of the graph may alternatively be differentiated from one another as having different "labels", "colors", and so forth.

The "edge(s)" of a graph each represent a connection or relationship between two nodes in the graph, and may also be referred to as "node associations". As described herein, each edge in the graph may be specified as being of a certain type. For instance, continuing the previous example of a graph representation of an online social network, edges of the graph may include follow types (e.g., user-follows-user or user-follows-web page), usage types (e.g., device-uses-IP address or user-uses-device), communication types (e.g., user-messages-user), and so forth. In some implementations, edges of the graph may be associated with different attributes and attribute values. In these implementations, an attribute value of a selected attribute can be used to specify the edge's type. Although described herein with respect to "type", edges of the graph may alternatively be differentiated from one another as having different "labels", "colors", and so forth.

Given the nodes of a graph that each represent a network entity and the entity's type, and the edges of the graph that each represent a node association between two nodes and the node association's type, the term "interconnected data" describes the overall graph data, which in turn represents the network. The graph data can accordingly represent a correlation of user devices, device locations (spatial information), device connections, the time of an associated event, IP connections, webpages visited, among any other characteristics reflective of the many types of networks referred to above, such as biological, genetic, medical, neural, science, research, communication, marketing, analytic, web-based, or any other types of complex networks.

The "typed graphlets" of a network refer to the motifs, or patterns of interconnections occurring in a complex network, that account for the type(s) of nodes and edges involved in the interconnections. In some implementations, typed graphlets may also be referred to as typed motifs, typed induced subgraphs, heterogeneous network motifs, colored network motifs, colored motifs, colored induced subgraphs, typed network motifs of a graph, and the like. In addition to considering typed graphlets, the techniques described herein are also configured to consider variations of a typed graphlet, such as typed orbits, type preserving graphlets, and so forth. Compared to a typed graphlet, a typed orbit is more fine-grained, while a type preserving graphlet is a more relaxed notion of a typed graphlet. For example, rather than treating a triangle where all three nodes are typed 'A' and another triangle where all three nodes are typed 'B' differently, a homogeneous typed motif can be implemented to merge the two triangles. In this manner, the techniques described herein can use any notion of typed subgraph pattern when referencing a typed graphlet.

Example Environment

FIG. 1 illustrates an example environment 100 in which aspects of higher-order network clustering and embedding can be implemented. The example environment 100 includes a computing device 102, which implements features of a network clustering module 104 and a network embedding module 106 to generate clusters and network embeddings of a heterogeneous network that includes typed graphlets. The computing device 102 can be implemented as any type of computing device, client device, mobile phone, tablet device, communication, entertainment, gaming, media playback, and/or other type of electronic and/or computing device. In this example environment 100, the computing device 102 may include any number and combination of different components as further described with reference to the example device shown in FIG. 7. For example, the computing device 102 in this example includes memory 108 and a processor 110, as well as any type of data storage 112 that may be implemented as any suitable memory, memory device, or electronic data storage.

The computing device 102 implements the network clustering module 104, such as in software, in hardware, or as a combination of software and hardware components. In the illustrated example, the network clustering module 104 is implemented as a software application or modules, such as executable software instructions (e.g., computer-executable instructions) that are executable with a processing system (e.g., the processor 110) of the computing device 102 to implement techniques of higher-order network clustering described herein. The network clustering module 104 can be stored on computer-readable storage media, such as any suitable memory device (e.g., the device memory 108) or electronic data storage implemented in the computing device 102.

The computing device 102 implements the network embedding module 106, such as in software, in hardware, or as a combination of software and hardware components. In the illustrated example, the network embedding module 106 is implemented as a software application or modules, such as executable software instructions (e.g., computer-executable instructions) that are executable with a processing system (e.g., the processor 110) of the computing device 102 to implement techniques of higher-order network clustering described herein. The network embedding module 106 can be stored on computer-readable storage media, such as any suitable memory device (e.g., the device memory 108) or electronic data storage implemented in the computing device 102.

In the illustrated example, the data storage 112 maintains interconnected data 114 in the form of a heterogeneous graph 116 that includes one or more typed graphlets 118. The heterogeneous graph 116 can be representative of any type of network, such as a social network, tech-based network, web-based network, or any other type of network represented by a graph that can include a variety of subgraphs 120. Generally, a subgraph 120 of the heterogeneous graph 116 is another graph formed from a subset of the vertices and edges (e.g., nodes and node associations) of the heterogeneous graph 116. A vertex subset includes all of the endpoints of an edge subset, and may also include additional vertices. The typed graphlets 118 are subgraphs that repeat themselves in the network or among various networks. Each of the subgraphs 120, as defined by a particular pattern of interactions between the nodes 122, can reflect a framework that represents dependencies and connectivity patterns among specified types of the nodes 122 and the node associations 124.

The heterogeneous graph 116 includes the nodes 122 that each represent an entity in the network, where different ones of the nodes 122 can correspond to different entity types. Thus, as described herein, the heterogeneous graph 116 may also be representative of a homogeneous graph, such as in a scenario where the nodes 122 of the graph each represent an entity of a same type. The node associations 124 of the heterogeneous graph 116 each represent an edge between two of the nodes 122 in the heterogeneous graph 116. In some implementations, a node association 125 may be based at least part on a temporal value that indicates a time at which the two nodes were associated with one another. For example, in a scenario where the heterogeneous graph 116 represents a social network where different members of the social network interact with one another, the node associations 124 may represent various interactions between two of the members of the social network, such as a message exchange between two members of the social network, establishing a friendship between two members of the social network, and so forth. In another example, the heterogeneous graph 116 may represent any type of network that evolves with the addition, deletion, and updates of various network entities and associations. Thus, by considering temporal values associated with node associations, the techniques described herein can account for changes to a network over time and generate clusterings and embeddings for use by a recommendation system to generate real-time recommendations that account for a current state of the network.

The computing device 102 implements the network clustering module 104 for graph traversal 126 and to determine a node ordering 128 for generating a clustering 130 that includes various nodes 122 of the heterogeneous graph 116 belonging to a common community, such as a household, a business, and so forth. In some implementations, the clustering 130 may be identified as including nodes 122 exhibiting similar behaviors patterns, such as those exhibited by one or more of the typed graphlets 118.

Generally, higher-order network clustering is described in the context of a network (e.g., represented by the heterogeneous graph 116. In implementations, the heterogeneous graph 116 may be mathematically represented as G=(V,E,ψ,ξ). The network is modeled as a heterogeneous graph, where nodes of the graph may represent different entities and edges of the graph may represent different relationship types among the different entities. The nodes of the network are represented by the node set V, and the edges of the network are represented by the edge set E. In this representation, ψ is the node-type mapping: V→$T_V$, where $T_V$ represents a set of node types. Continuing this representation, ξ is the edge-type mapping: E→$T_E$, where $T_E$ represents a set of edge types. Using this representation, the node set of the network G is represented as V(G) and the edge set is represented as E(G).

Using this representation, a heterogeneous network may be represented by an arbitrary number of matrices and tensors that are coupled (i.e., the tensors and matrices share at least one type with each other). By modeling a network in this manner, the network clustering module 104 is configured to perform the techniques described herein for any type of network graph. For example, the network clustering module 104 is configured to perform higher-order network clustering for a homogenous network graph, which would result from a scenario where $|T_V|=|T_E|=1$. As additional examples, the network clustering module 104 is configured to perform higher-order network clustering for bipartite graphs, signed network graphs with positive and negative types, weighted graphs, unweighted graphs, undirected graphs, directed graphs, labeled graphs, unlabeled graphs, combinations thereof, and so forth.

As evidenced from this definition of a heterogeneous graph, a homogeneous graph is representative of a special case of a heterogeneous graph, where the graph includes nodes of a single node type and edges of a single edge type. Other special cases of heterogeneous graphs include bipartite graphs that include two node types and a single edge type, k-partite graphs, combined homogeneous and k-partite graphs (e.g., user-user friendship/retweet/following graph), and so forth. Thus, although discussed with respect to a heterogeneous graph, with techniques described herein are applicable to a wide range of diverse graph types.

Regardless of a graph type used to model a network, each graph may include a variety of subgraphs, and may include one or more recurrent and statistically significant subgraphs or patterns in the graph. As described herein, a "graphlet" refers to a subgraph or pattern of interest in a given network graph. For scenarios where a network can be modeled as a homogenous graph, the network clustering module 104 is configured to implement an untyped graphlet. As used herein, an untyped graphlet of a network graph G is a connected induced subgraph of G. Given an untyped graphlet in G, the network clustering module 104 is configured to identify other topologically identical instances of the graphlet in G. For example, an instance of an untyped graphlet H in graph G is an untyped graphlet F in G that is isomorphic to H.

In implementations where a network is modeled as a heterogeneous graph, however, nodes and edges can each be of many different types. Thus, for heterogeneous network graphs, the network clustering module 104 is configured to generalize higher-order clustering through the use of a typed graphlet that is able to capture both the connectivity pattern of interest and the corresponding node and edge types. Specifically, a typed graphlet of the graph G=(V,E,ψ,ξ), is a connected induced subgraph H=(V',E',ψ',ξ') of G, such that the following three conditions are satisfied:

1. (V',E') is a graphlet of (V,E);
2. ψ'=ψ|V', where ψ is the restriction of ψ to V'; and
3. ξ'=ξ|E', where ξ is the restriction of ξ to E'.

Thus, for a typed graphlet, the network clustering module 104 is configured to identify other instances of the typed graphlet, such as other topologically identical appearances of a typed graphlet in a heterogeneous graph that preserve the type structure of the typed graphlet. For example, an instance of a typed graphlet H=(V',E',ψ',ξ') may be a typed graphlet F=(V",E",ψ",ξ") of G, such that:

1. (V",E") is isomorphic to (V',E'); and
2. $T_{V''}=T_{V'}$ and $T_{E''}=T_{E'}$, where the sets of node types and edge types are correspondingly equal.

In this manner, the set of unique typed graphlet instances of H in graph G may be denoted as $I_G(H)$.

In order to score the quality of a higher-order clustering, the network clustering module 104 is configured to determine a typed graphlet conductance for a fixed heterogeneous graph G and a typed graphlet H of G. To determine the typed graphlet conductance, the network clustering module 104 first determines a typed graphlet degree, a typed graphlet volume, and a typed graphlet cut size.

Typed Graphlet Degree. As described herein, the typed graphlet degree based on the typed graphlet H of a node v∈V(G) refers to the total number of incident edges, or connections, to v over all unique instances of H. In this manner, a typed graphlet degree can be defined as follows in Equation 1:

$$deg_G^H(v) = \sum_{F \in I_G(H)} |\{e \in E(F) \mid v \in e\}| \quad \text{(Eq. 1)}$$

Typed Graphlet Volume. As described herein, the typed graphlet volume based on the typed graphlet H of a subset of nodes S⊂V(G) refers to the total number of incident edges, or connections, to any node in S over all instances of H. Thus, the typed graphlet volume represents the sum of the typed graphlet degrees based on H over all nodes in S. In this manner, the typed graphlet volume can be defined as follows in Equation 2:

$$vol_G^H(S) = \sum_{v \in S} deg_G^H(v) \quad \text{(Eq. 2)}$$

Typed Graphlet Cut Size. As described herein, a cut in a graph G is a partition of the underlying node set V(G) into two proper, nonempty subsets S and $\bar{S}$, where $\bar{S}$=V(G)/S. Such a cut can be noted as an ordered pair (S,$\bar{S}$), and for any given cut in a graph, the network clustering module 104 may define a notion of cut size. Specifically, the typed graphlet cut size based on the typed graphlet H of a cut $(S,\overline{S})$ in the graph G represents the number of unique instances of H crossing the cut. As such, the typed graphlet cut size can be defined as follows in Equation 3:

$$\text{cut}_G^H(S,\overline{S}) = |\{F \in I_G(H) | V(F) \cap S \neq \emptyset, V(F) \cap \overline{S} \neq \emptyset\}| \quad \text{(Eq. 3)}$$

As described herein, a typed graphlet can cross a cut with any of its edges. Thus, a typed graphlet may add to the cut size in more ways than simply as an edge. Therefore, given the notions of typed graphlet volume and typed graphlet cut size for higher-order typed substructures, the network clustering module 104 is configured to determine a typed graphlet conductance for a fixed heterogeneous graph G and a typed graphlet H of G.

Typed Graphlet Conductance. The typed graphlet conductance for a fixed heterogeneous graph G and a typed graphlet H of a cut $(S,\overline{S})$ in G can be defined as follows in Equation 4:

$$\phi_G^H(S,\overline{S}) = \frac{\text{cut}_G^H(S,\overline{S})}{\min(\text{vol}_G^H(S), \text{vol}_G^H(\overline{S}))} \quad \text{(Eq. 4)}$$

Similarly, the typed graphlet conductance based on a typed graphlet H of G is defined as the minimum typed graphlet conductance based on H over all possible cuts in G, as set forth in Equation 5. Specifically, the cut achieving the minimal typed graphlet conductance as set forth in Equation 5 corresponds to the cut of graph G that minimized an amount of times in which instances of the typed graphlet H are cut.

$$\phi^H(G) = \min_{S \subset V(G)} \phi_G^H(S,\overline{S}) \quad \text{(Eq. 5)}$$

Given a typed graphlet conductance based on a typed graphlet H of G, the network clustering module 104 is configured to generate a bipartition of G that minimimizes the number of instances of the typed graphlet H that are cut and that is balanced in terms of a total graphlet degree contribution of all instances of H on each partition. Although described herein with respect to generating a bipartition of G using typed graphlet conductance as the measure of cluster quality, the techniques described herein may alternatively generate the bipartition of G using typed graphlet cut weight, typed graphlet cut ratio, typed graphlet average cut, or typed graphlet edge expansion as the measure of cut quality.

To generate this bipartition, the network clustering module 104 generates a higher-order Laplacian for the heterogeneous graph G and the typed graphlet H of G. Specifically, given the set of unique typed graphlet instances of H in graph G, denoted as $I_G(H)$, the network clustering module 104 generates a matrix that has the same dimensions as the adjacency matrix of G and includes entries defined by the count of unique instances of the typed graphlet H containing edges in G. This matrix generated by the network clustering module 104 may be referred to as the typed graphlet adjacency matrix.

Assuming that the node set for $G, V(G) = \{v_1, \ldots, v_n\}$, the typed graphlet adjacency matrix can be defined by $W_{G^H}$, for $i,j=1, \ldots, n$, as set forth in Equation 6:

$$(W_{G^H})_{ij} = \sum_{F \in I_G(H)} 1(\{v_i, v_j\} \in E(F)) \quad \text{(Eq. 6)}$$

As defined by Equation 6, the i,j entry of $W_{G^H}$ is equal to the number of unique instances of H that contain nodes $\{v_i, v_j\} \subset V(G)$ as an edge. In Equation 6, $G^H$ is denoted as the weighted graph represented by $W_{G^H}$. Thus, given the definition of $W_{G^H}, E(F) \subset E(G^H)$ for any $F \in I_G(H)$. The network clustering module 104 then constructs the weighted normalized Laplacian of $W_{G^H}$, denoted as $L_{G^H}$ and defined by Equation 7:

$$L_{G^H} = I - D_{G^H}^{-1/2} W_{G^H} D_{G^H}^{-1/2} \quad \text{(Eq. 7)}$$

As used in Equation 7, $D_{G^H}$ is defined as shown in Equation 8, for $i=1, \ldots, n$:

$$(D_{G^H})_{ii} = \sum_j (W_{G^H})_{ij} \quad \text{(Eq. 8)}$$

This higher-order Laplacian generated by the network clustering module 104 may be referred to as the typed graphlet normalized Laplacian based on the typed graphlet H of G, and represents the fundamental structure used by the network clustering module 104 to generate the bipartition of G that minimimizes the number of instances of the typed graphlet H that are cut and that is balanced in terms of a total graphlet degree contribution of all instances of H on each partition. Mathematically, the minimum typed graphlet conductance optimization problem is represented as follows in Equation 9:

$$S_{best} = \min_{S \subset V(G)} \phi_G^H(S,\overline{S}) \quad \text{(Eq. 9)}$$

To solve the minimum typed graphlet conductance problem, the network clustering module 104 implements a typed graphlet spectral clustering algorithm to return a near-optimal bipartition of G. Specifically, the network clustering module 104 generates a cluster by applying the typed graphlet spectral clustering algorithm to a heterogeneous graph G and a typed graphlet H of G. The steps of the typed graphlet spectral clustering algorithm implemented by the network clustering module 104 are specified below in Algorithm 1:

---
Algorithm 1:
---

$W_{G^H} \leftarrow$ typed graphlet adjacency matrix of G based on H
$N \leftarrow$ number of connected components of $G^H$
$\phi_{min} \leftarrow \infty$
$S_{best} \leftarrow$ initialize space for best cluster
for $i \leftarrow 1$ to N do
    $W \leftarrow$ submatrix of $W_{G^H}$ on connected component i
    $L \leftarrow$ typed graphlet normalized Laplacian of W
    $v_2 \leftarrow$ eigenvector of L with 2nd smallest eigenvalue
    $\sigma \leftarrow$ argsort($v_2$)
    $\phi \leftarrow \min_k \phi_G^H(S_k, \overline{S}_k)$, where $S_k = \{\sigma_1, \ldots, \sigma_k\}$
    if $\phi < \phi_{min}$ then
        $\phi_{min} \leftarrow \phi$
        $S \leftarrow \text{argmin}_k \phi_G^H(S_k, \overline{S}_k)$
        if $|S| < |\overline{S}|$ then $S_{best} \leftarrow S$
        else $S_{best} \leftarrow \overline{S}$
return $S_{best}$ In Algorithm 1, v denotes the eigenvector corresponding to the second smallest eigenvalue of the normalized typed graphlet Laplacian $L_{G^H}$, noted above in Equation 7. The typed graphlet spectral ordering is represented by the permutation $\sigma=(i_1, i_2, \ldots, i_n)$ of coordinate indices (1, 2, . . . , n), such that $v_{i_1} \le v_{i_2} \le \ldots \le v_{i_n}$, where $\sigma$ is the permutation of coordinate indices of v that sorts the corresponding coordinate values from smallest to largest.

In some implementations, Algorithm 1 is adapted to generate multiple clusters through simple recursive bipartitioning. In this manner, the clustering 130 generated by the network clustering module 104 illustrated in FIG. 1 may be representative of multiple clusters, where recursive bipartitioning is implemented by the network clustering module 104 to generate more fine-grained clusters. Alternatively or additionally, using the typed graphlet normalized Laplacian, the lower k eigenvectors may be embedded into a lower dimensional Euclidean space. Upon embedding the lower k eigenvectors into the lower dimensional Euclidean space, a Euclidean clustering algorithm (e.g., k-means) may be implemented to associate the nodes 122 to an appropriate clustering 130 in the lower dimensional Euclidean space. In addition to identifying node clusters, the computing device 102 is configured to derive higher-order node embeddings based on the typed graphlet Laplacian matrix through the implementation of network embedding module 106. The computing device 102 implements the network embedding module 106 for graph traversal 132 and to derive higher-order network embeddings 134, which correlates a mapping of the nodes 122 to d-dimensional features represented by the higher-order network embeddings 134. The network embedding module 106 can then concatenate the higher-order network embeddings 134 into a matrix representation, as represented by the typed graphlet embedding matrix 136. From the typed graphlet embedding matrix 136, the network embedding module 136 is configured to identify subgraph patterns of the typed graphlets 118 of the network. Specifically, for a typed graphlet H of interest, the network embedding module 106 generates a matrix Z of node embeddings using Algorithm 2, described below.

For a graph G having numerous connected components, the network embedding module 106 calls Algorithm 2 for each connected component of $G^H$ and stores the resulting embeddings in the corresponding locations of the overall embedding matrix Z. The steps involved in generating the higher-order embedding matrix Z are specified below in Algorithm 2:

edge of G, the network embedding module 106 forms the weighted typed graphlet adjacency matrix $W_{G^H}$, noted above in Equation 6.

Using the weighted typed graphlet adjacency matrix, the network embedding module 106 derives a typed graphlet Laplacian matrix $L_{G^H}$, as noted above in Equation 7. From the typed graphlet Laplacian matrix, the network embedding module 106 computes eigenvectors corresponding to the D smallest eigenvalues, where D is representative of an embedding dimension that is given as an input to the network embedding module 106. Given the D eigenvectors of the typed graphlet Laplacian matrix, the network embedding module 106 generates a matrix X, which spans N rows by D columns. From matrix X, the network embedding module 106 normalizes matrix X to generate a matrix Z. As described herein, matrix Z is a higher-order embedding matrix for the typed graphlet of interest, H, where $Z \in \mathbb{R}^{N \times D}$. Thus, the matrix Z includes information describing a higher-order typed graphlet embedding for each node represented in the matrix.

From the overall embedding matrix Z, the network embedding module 106 is configured to receive a set of session identifiers and/or cookie identifiers and predict whether the set of session identifiers and/or cookie identifiers belong to a common entity, such as belonging to a same user, a household of users, and so forth. In an example implementation, the set of session identifiers and/or cookie identifiers may correspond to a set of nodes in the heterogeneous graph 116, as illustrated in FIG. 1. To perform link prediction, the network embedding module 106 computes edge embeddings from the overall embedding matrix Z by combining the learned node embedding vectors of the corresponding nodes using an edge embedding function $\Phi$. Specifically, given D-dimensional edge embedding vectors $z_i$ and $z_j$ for node i and j, the network embedding module 106 derives a D-dimensional edge embedding vector $z_{ij}=\Phi(z_i, z_j)$, where $\Phi$ is representative of one of the following edge embedding functions:

$$\Phi \in \left\{ \frac{z_i + z_j}{2}, z_i \odot z_j, z_i - z_j, (z_i - z_j)^{\circ 2}, \max(z_i, z_j), z_i + z_j \right\}$$

In the above edge embedding functions, $z_i \odot z_j$ represents the element-wise, or Hadamard, product, $z^{\circ 2}$ represents the Hadamard power, and $\max(z_i, z_j)$ represents the element-wise max.

---

Algorithm 2:

$(W_{G^H})_{ij} \leftarrow$ number of instances of H containing i and j, $\forall(i,j) \in E$;
$D_{G^H} \leftarrow$ typed graphlet degree matrix $(D_{G^H})_{ij} = \Sigma_j (W_{G^H})_{ij}$;
$x_1, x_2, \ldots, x_D \leftarrow$ eigenvectors of D smallest eigenvalues of $L_{G^H}$, as described above in Eq. 7;
$Z_{ij} \leftarrow X_{ij} / \sqrt{\Sigma_i x_{ij}^2}$ and
return $Z = [z_1\ z_2\ \ldots\ z_n]^T \in \mathbb{R}^{N \times D}$.

---

As shown in Algorithm 2, given device graph web logs represented as a heterogeneous graph G with a type vector that encodes the entity type of each node in the graph and a typed graphlet of interest (H of G), the network embedding module 106 computes the frequency of the typed graphlet for every edge. In an implementation where the heterogeneous graph G is represented as a sparse matrix, each edge is represented as a nonzero value in the sparse matrix. After computing the frequency of the typed graphlet for every By computing edge embeddings from the overall embedding matrix Z, the network embedding module 106 outputs an embedding vector for different session identifiers and/or cookie identifiers, such as an embedding vector for cookie identifier i and cookie identifier j. In some implementations, the network embedding module 106 additionally derives edge embeddings between nodes that are known to not align or match with one another. These edge embeddings are used as negative examples for training to improve performance of a model used to predict whether two or more nodes belong to a common entity. In a similar manner, the network embedding module 106 derives edge embeddings between nodes that are known to align or match with one another, which are useable as positive training examples for the model used to predict whether two or more nodes belong to a common entity.

In some implementations, the positive and negative training examples are labeled appropriately and merged with one another to train the model simultaneously on positive and negative examples. After training, the model can be implemented by the network embedding module 106 to predict whether two or more nodes belong to a common entity. As described herein, the model implemented by the network embedding module 106 may be any suitable type of model, such as a logistic regression model, support vector machines, neural networks, and so forth. The network embedding module 106's implementation of a trained model to predict whether nodes belong to a common entity is described in further detail below with respect to FIG. 4.

In some implementations, the techniques described herein may be implemented to find cluster mixed-membership vectors for each node. For instance, the higher-order node embeddings may be normalized between zero and one, and assigned a membership vector that indicates the node's cluster membership for each cluster included in the clustering 130. In this manner, instead of assigning a node to a single cluster of the clustering 130, one or more of the nodes 122 may be assigned to multiple clusters.

Having considered an example digital medium environment, consider now a discussion of example systems that are useable to perform higher-order network clustering and embedding in accordance with one or more aspects of the disclosure.

Figure 2:
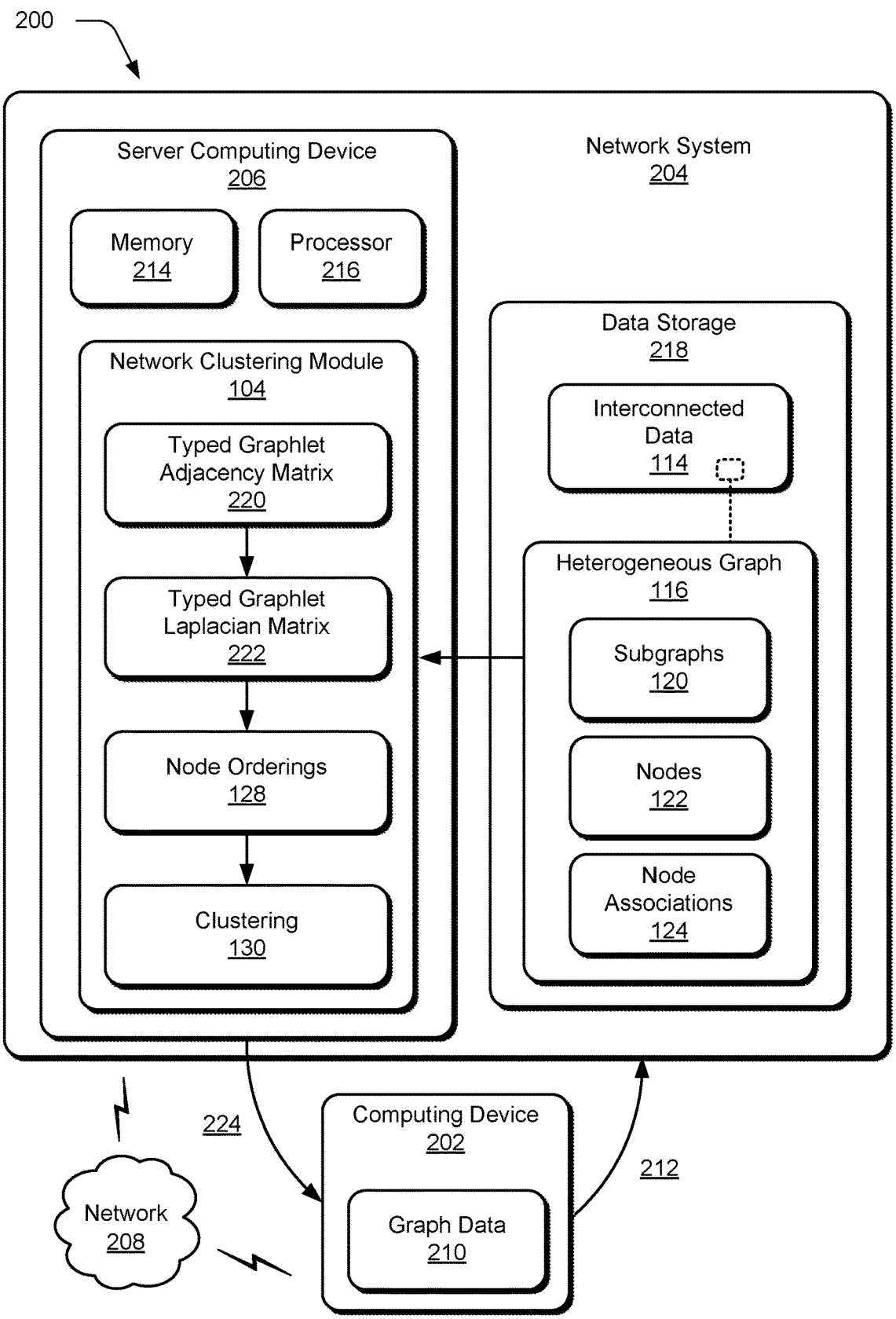
FIG. 2 illustrates an example environment in which a network clustering module of FIG. 1 performs higher-order network clustering using techniques described herein.

FIG. 2 illustrates an example environment 200 in which aspects of higher-order network clustering can be implemented. The example environment 200 includes a computing device 202 and a network system 204, which implements features of the network clustering module 104. The computing device 202 can be implemented as any type of computing device, such as the computing device 102 illustrated and described with respect to FIG. 1. In the example environment 200, the computing device 202 may include any number and combination of different components as described in further detail below with respect to FIG. 7. The computing device is configured to access and communicate with a server computing device 206 of the network system 204, such as via communication network 208.

In accordance with one or more implementations, a user of the computing device 202 may upload graph data 210 to the network system 204, where the graph data 210 represents the interconnected data 114, the heterogeneous graph 116, or any other type of graph data representative of a complex or dynamic network. The network system 204 can receive the uploaded graph data 210 as an input to the network clustering module 104 from the computing device 202, as indicated at 212 via the network 208.

As described herein, any of the devices, servers, and/or services of the example environment 200 are configured to communicate via the network 208, such as for communication of data between the computing device 202 and the network system 204. The network 208 may be implemented as a wired and/or a wireless network. In some implementations, the network 208 may be configured using any type of network topology and/or communication protocol, and can be represented or otherwise implemented as a combination of two or more networks to include IP-based networks and/or the Internet. The network 208 may also include mobile operator networks that are managed by a mobile network operator and/or other network operators, such as a communication service provider, mobile phone provider, and/or Internet service provider.

In the example environment 200, the network system 204 is representative of any number of cloud-based access sites that provide a service and/or from which data and information is available, such as via the Internet, for on-line and/or network-based access. The network system 204 can be accessed on-line, and includes the server computing device 206, which is representative of one or more hardware server devices (e.g., computing devices) that may be implemented at the network system. The server computing device 206 includes memory 214 and a processor 216, and may include any number and combination of different components as further described with reference to the example device shown in FIG. 7.

In the illustrated example, the server computing device 206 is configured to implement the network clustering module 104 in software, in hardware, or as a combination of software and hardware components, such as shown and described above with respect to FIG. 1. In the example environment 200, the network clustering module 104 is implemented as a software application or modules, such as executable software instructions (e.g., computer-executable instructions) that are executable with a processing system (e.g., the processor 216) of the server computing device 206 to implement the techniques of higher-order network clustering. The network clustering module 104 can be stored on computer-readable storage media, such as any suitable memory device (e.g., the device memory 214) or electronic data storage implemented in the server computing device 206 and/or at the network system 204.

The network system 204 may include multiple data storage components, server devices, and applications, and may be implemented with various components as further described with reference to the example device of FIG. 7. The network system 204 additionally includes data storage 218 that may be implemented as any suitable type of memory, memory device, or electronic data storage for network-based data storage. The data storage 218 is utilized by the network system 204 to maintain the interconnected data 114 and the heterogeneous graph 116 that represents a network, as illustrated and described with respect to FIG. 1.

In implementing aspects of higher-order network clustering, the network clustering module 104 is configured to receive graph data 210, such as graph data uploaded from the computing device in the form of the heterogeneous graph 116. As described and illustrated with respect to FIG. 1, the network clustering module 104 is implemented to generate a typed graphlet adjacency matrix 220. In implementations, the network clustering module 104 is configured to generate the typed graphlet adjacency matrix 220 by traversing the heterogeneous graph 116. In an example implementation where the subgraphs 120 of the heterogeneous graph 116 include a typed graphlet H and the nodes 122 are defined as the node set $V(G)=\{v_i, \ldots, v_n\}$, the typed graphlet adjacency matrix can be defined as $W_{G^H}$, for $i,j=1, \ldots, n$, as described above with respect to Equation 6.

From the typed graphlet adjacency matrix 220, the network clustering module 104 generates the typed graphlet Laplacian matrix 222. For instance, the network clustering module 104 constructs the weighted normalized Laplacian of $W_{G^H}$, denoted as $L_{G^H}$ and described above with respect to Equation 7. This higher-order Laplacian generated by the network clustering module 104 may be referred to as the typed graphlet normalized Laplacian based on the typed graphlet H of the heterogeneous graph 116. From the typed graphlet Laplacian matrix 222, the network clustering module determines the node orderings 128 by computing the eigenvector corresponding to the second smallest eigenvalue of the typed graphlet Laplacian matrix 222. The components of the computed eigenvector provide the node orderings 128, which may be represented mathematically as σ. From the computed eigenvector, the network clustering module produces nested sets $S_k=\{\sigma_1, \sigma_2, \ldots, \sigma_k\}$ of increasing size k, where each nested set may correspond to a cluster. To generate clustering 130, the network clustering module 104 identifies $S_{best}$ by identifying a nested set having the minimum typed graphlet conductance, which may be determined by implementing Algorithm 1, as described above with respect to FIG. 1. The clustering 130, the node orderings 127, the typed graphlet Laplacian matrix 222, and/or the typed graphlet adjacency matrix 220 can be communicated as feedback from the network system 204 to the computing device 202. As indicated at 224 via the network 208. A user of the computing device 202 can then determine at least one clustering 130 to capture the notion of high-quality clusters across a wide variety of graph types from different domains.

The clustering 130 generated by the network clustering module 104 using the typed graphlet spectral clustering techniques described herein represents a measureable improvement over conventional approaches for clustering techniques. This measureable improvement is quantified in the following Tables 1 and 2. Table 1 represents various networks, along with their properties and statistics, each of which may be representative of a heterogeneous graph 116. In Table 1, |V| indicates a number of nodes in the network, such as nodes 122 as illustrated for the heterogeneous graph 116. |G| indicates a number of edges in the network, such as node associations 124 as illustrated for the heterogeneous graph 116. $|\tau_T|$ represents a number of node types present in the network, and $|\tau_E|$ represents a number of edge, or node association, types present in the network. Finally, Table 1 specifies the number of unique typed graphlets that occur for each induced subgraph 120, such as the typed graphlets 118 illustrated in FIG. 1.

TABLE 1

| Graph | |V| | |E| | $|\tau_T|$ | $|\tau_E|$ | ▲ | ▱ | ◁ | Y | ⌂ | ⟁ | ⬠ | ⬡ |
|---|---|---|---|---|---|---|---|---|---|---|---|---|
| yahoo-msg | 100.1 k | 739.8 k | 2 | 2 | 3 | 2 | 3 | 4 | 3 | 3 | 3 | 2 |
| dbpedia | 495.9 k | 921.7 k | 4 | 3 | 8 | 0 | 6 | 10 | 5 | 0 | 0 | 0 |
| digg | 283.2 k | 4.6M | 2 | 2 | 4 | 3 | 4 | 5 | 4 | 4 | 4 | 2 |
| movie-lens | 28.1 k | 170.4 k | 3 | 3 | 7 | 1 | 6 | 9 | 6 | 3 | 3 | 0 |
| citeulike | 907.8 k | 1.4M | 3 | 2 | 5 | 0 | 3 | 6 | 3 | 0 | 0 | 0 |
| fb-CMU | 6.6 k | 250 k | 3 | 6 | 10 | 10 | 15 | 15 | 15 | 15 | 15 | 15 |
| reality | 6.8 k | 7.7 k | 2 | 3 | 4 | 3 | 4 | 5 | 4 | 4 | 4 | 2 |
| gene | 1.1 k | 1.7 k | 2 | 3 | 4 | 4 | 5 | 5 | 5 | 5 | 5 | 5 |
| citeseer | 3.3 k | 4.5 k | 6 | 21 | 56 | 40 | 124 | 119 | 66 | 98 | 56 | 19 |
| cora | 2.7 k | 5.3 k | 7 | 28 | 82 | 49 | 202 | 190 | 76 | 157 | 73 | 19 |
| webkb | 262 | 459 | 5 | 14 | 31 | 21 | 59 | 59 | 23 | 51 | 32 | 8 |
| pol-retweet | 18.5 k | 48.1 k | 2 | 3 | 4 | 4 | 5 | 5 | 5 | 5 | 5 | 4 |
| web-spam | 9.1 k | 465 k | 3 | 6 | 10 | 10 | 15 | 15 | 15 | 15 | 15 | 15 |
| fb-relationship | 7.3 k | 44.9 k | 6 | 20 | 50 | 47 | 112 | 109 | 85 | 106 | 89 | 77 |

Table 2 quantifies the external conductance score of the typed graphlet clustering techniques described herein, denoted as "TGS" in comparison to a range of methods for clustering heterogeneous graphs. To show improvements over conventional approaches that do not explicitly support heterogeneous graphs, nodes of the input graph were aligned according to their object types with re-ordered identifiers to form a homogenous representation. For clarity, these approaches that do not explicitly support heterogeneous graphs are denoted with the suffix "-H" in Table 2. Specifically, Table 2 evaluates the performance of network clustering module 104 relative to the "Densest Subgraph" method (DS-H), the "KCore Communities" method (KCore-H), the "Label Propagation" method ("LP-H"), the "Louvain" method (Louv-H), the "Spectral Clustering" method (Spec-H), and the untyped graphlet spectral clustering method (GSpec-H). As indicated by the results in Table 3, the techniques described herein are able to reveal better high-quality clusters across a range of different heterogeneous graphs.

TABLE 2

| | DS-H | KCore-H | LP-H | Louv-H | Spec-H | GSpec-H | TGS |
|---|---|---|---|---|---|---|---|
| yahoo-msg | 0.5697 | 0.6624 | 0.2339 | 0.3288 | 0.0716 | 0.2000 | 0.0588 |
| dbpedia | 0.7414 | 0.5586 | 0.4502 | 0.8252 | 0.9714 | 0.9404 | 0.0249 |
| digg | 0.4122 | 0.4443 | 0.7555 | 0.3232 | 0.0006 | 0.0004 | 0.0004 |
| movie-lens | 0.9048 | 0.9659 | 0.7681 | 0.8620 | 0.9999 | 0.6009 | 0.5000 |
| citeulike | 0.9898 | 0.9963 | 0.9620 | 0.8634 | 0.9982 | 0.9969 | 0.7159 |
| fb-CMU | 0.6738 | 0.9546 | 0.9905 | 0.8761 | 0.5724 | 0.8571 | 0.5000 |
| reality | 0.7619 | 0.3135 | 0.2322 | 0.1594 | 0.6027 | 0.0164 | 0.0080 |
| gene | 0.8108 | 0.9298 | 0.9151 | 0.8342 | 0.4201 | 0.1667 | 0.1429 |
| citeseer | 0.5000 | 0.6667 | 0.6800 | 0.6220 | 0.0526 | 0.0526 | 0.0333 |
| cora | 0.0800 | 0.9057 | 0.8611 | 0.8178 | 0.0870 | 0.0870 | 0.0500 |
| webkb | 0.2222 | 0.9286 | 0.6154 | 0.8646 | 0.6667 | 0.3333 | 0.2222 |
| pol-retweet | 0.5686 | 0.6492 | 0.0291 | 0.0918 | 0.6676 | 0.0421 | 0.0220 |
| web-spam | 0.8551 | 0.9331 | 0.9844 | 0.7382 | 0.9918 | 0.5312 | 0.5015 |
| fb-relationship | 0.6249 | 0.9948 | 0.5390 | 0.8392 | 0.9999 | 0.5866 | 0.4972 |

The benefits of the typed graphlet clustering techniques implemented by network clustering module 104 is further evidenced by Table 3, which describes the improvement, or gain, of the techniques described herein relative to conventional approaches. In Table 3, improvement is calculated as $\mathbb{E}(\mathbb{E}_i)/\mathcal{A}(\mathcal{A}_0)$, where $\mathbb{E}(\mathcal{A}_i)$ represents the external conductance of the conventional approach of the column in Table 3 and $\mathbb{E}(\mathcal{A}_0)$ represents the external conductance of Algorithm 1, as described above with respect to FIG. 1. In Table 3, values less than one indicate that the techniques described herein performed worse than the corresponding conventional approach, while values greater than one indicate the improvement factor achieved by the techniques described herein. As indicated in Table 3, the techniques described herein achieve a mean improvement of over 67 times relative to various tested graph data and baseline methods.

TABLE 3

|  | DS | KC | LP | Louv | Spec | GSpec | Mean Gain |
|---|---|---|---|---|---|---|---|
| yahoo-msg | 9.69x | 11.27x | 3.98x | 5.59x | 1.22x | 3.40x | 5.86x |
| dbpedia | 29.78x | 22.43x | 18.08x | 33.14x | 39.01x | 37.77x | 30.03x |
| digg | 1030x | 1110x | 1888x | 808x | 1.50x | 1.00x | 806.75x |
| movielens | 1.81x | 1.93x | 1.54x | 1.72x | 2.00x | 1.20x | 1.70x |
| citeulike | 1.38x | 1.39x | 1.34x | 1.21x | 1.39x | 1.39x | 1.35x |
| fb-CMU | 1.35x | 1.91x | 1.98x | 1.75x | 1.14x | 1.71x | 1.64x |
| reality | 95.24x | 39.19x | 29.02x | 19.92x | 75.34x | 2.05x | 43.46x |
| gene | 5.67x | 6.51x | 6.40x | 5.84x | 2.94x | 1.17x | 4.75x |
| citeseer | 15.02x | 20.02x | 20.42x | 18.68x | 1.58x | 1.58x | 12.88x |
| cora | 10.00x | 13.33x | 17.22x | 16.36x | 1.74x | 1.74x | 10.07x |
| webkb | 1.00x | 4.18x | 2.77x | 3.89x | 3.00x | 1.50x | 2.72x |
| pol-retweet | 25.85x | 29.51x | 1.32x | 4.17x | 30.35x | 1.91x | 15.52x |
| web-spam | 1.71x | 1.86x | 1.96x | 1.47x | 1.98x | 1.06x | 1.67x |
| fb-relationship | 1.26x | 2.00x | 1.08x | 1.69x | 2.01x | 1.18x | 1.54x |

The node orderings 128 generated by the network clustering module 104 are further beneficial for graph compression, which is useful in both reducing the amount of input/output traffic and speeding up existing algorithms by reducing an amount of work required to achieve a compression of acceptable quality, which rely on an ordering of vertices in the graph. The graph compression benefits are quantified in Table 4, which describes results of comparing the obtained compression by reporting the size of each heterogeneous graph in bytes after compression. Specifically, four orderings are evaluated: the native order, the spectral ordering (untyped edge), untyped graphlet ordering, and typed graphlet spectral ordering, which is representative of the node orderings 128 generated by the network clustering module 104. The reported results in Table 4 represent the best result given by an ordering from any untyped or typed graphlet. Even though node types are not used when deriving the node orderings 128, the techniques described herein arranges the rows/columns of partition sub-matrices according to node type. Thus, in addition to achieving better compression across other methods and heterogeneous graphs, the techniques described herein provide node orderings based on node type, whereas conventional approaches order nodes of different types mixed with one another.

TABLE 4

| Graph | Native | Spec | GSpec | TGS | Gain |
|---|---|---|---|---|---|
| movielens | 585588 | 471246 | 464904 | 444252 | 14.18% |
| yahoo-msg | 3065499 | 2694151 | 2708700 | 2427325 | 16.29% |
| dbpedia | 4800584 | 3520721 | 3469878 | 3111728 | 26.31% |
| digg | 15989475 | 10462874 | 10296144 | 9677741 | 26.57% |

Figure 3:
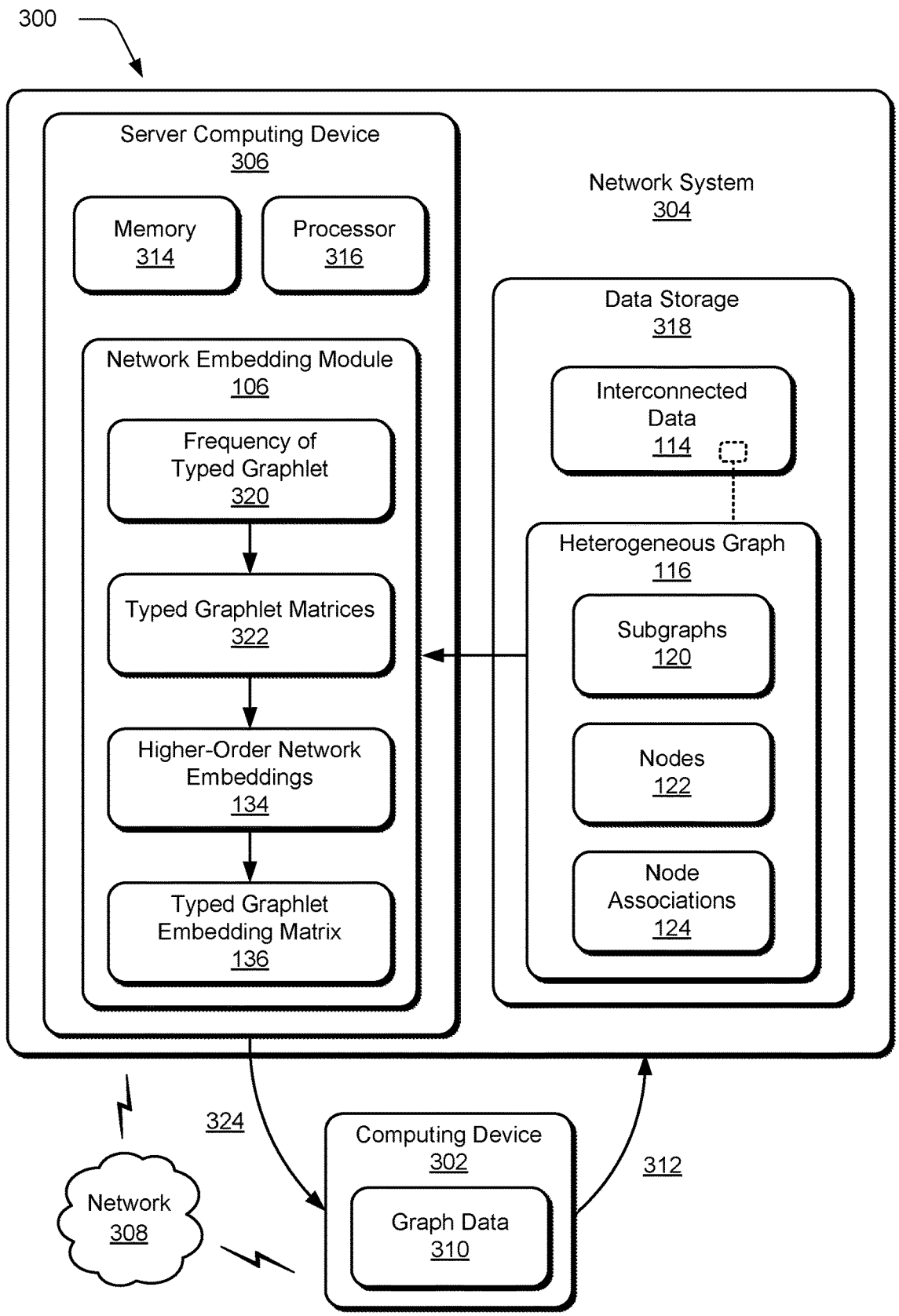
FIG. 3 illustrates an example environment in which a network embedding module of FIG. 1 performs higher-order network embedding using techniques described herein.

FIG. 3 illustrates an example environment 300 in which aspects of higher-order network embedding can be implemented. The example environment 300 includes a computing device 302 and a network system 304, which implements features of the network embedding module 106. The computing device 302 can be implemented as any suitable type of computing device, such as the computing device 102 illustrated and described with respect to FIG. 1. In the example environment 300, the computing device 302 may include any number and combination of different components as described in further detail below with respect to FIG. 7. The computing device 302 is configured to access and communicate with a server computing device 306 of the network system 304, such as via communication network 308.

A user of the computing device 302 may upload graph data 310 to the network system 304, where the graph data 310 may be the interconnected data 114, the heterogeneous graph 116, or any other type of graph data that represents a complex or dynamic network, such as subgraphs 120, nodes 122, and/or node associations 124. The network system 304 can receive the uploaded graph data 310 as an input to the network embedding module 106 from the computing device 302, as indicated at 312 via the network 308.

Any of the devices, servers, and/or services described herein can communicate via the network 308, such as for data communication between the computing device 302 and the network system 304. The network 308 can be implemented to include a wired and/or a wireless network. The network can also be implemented using any type of network topology and/or communication protocol, and can be represented or otherwise implemented as a combination of two or more networks, to include IP-based networks and/or the Internet. The network 308 may also include mobile operator networks that are managed by a mobile network operator and/or other network operators, such as a communication service provider, mobile phone provider, and/or Internet service provider.

In the example environment 300, the network system 304 is representative of any number of cloud-based access sites that provide a service and/or from which data and information is available, such as via the Internet, for on-line and/or network-based access. The network system 304 can be accessed on-line, and includes the server computing device 306, which is representative of one or more hardware server devices (e.g., computing devices) that may be implemented at the network system. The server computing device 306 includes memory 314 and a processor 316, and may include any number and combination of different components as further described with reference to the example device shown in FIG. 7.

The server computing device 306 is illustrated as implementing the network embedding module 106, such as in software, in hardware, or as a combination of software and hardware components, generally as shown and described with reference to FIG. 1. In this example, the network embedding module 106 is implemented as a software application or modules, such as executable software instructions (e.g., computer-executable instructions) that are executable with a processing system (e.g., the processor 316) of the server computing device 306 to implement the techniques of higher-order network embedding. The network embedding module 106 can be stored on computer-readable storage media, such as any suitable memory device (e.g., the device memory 314) or electronic data storage implemented in the server computing device 306 and/or at the network system 304.

The network system 304 may include multiple data storage, server devices, and applications, and can be implemented with various components as further described with reference to the example device shown in FIG. 7. The network system 304 also includes data storage 318 that may be implemented as any suitable memory, memory device, or electronic data storage for network-based data storage. The data storage 318 is utilized at the network system 304 to maintain the interconnected data 114 and/or the heterogeneous graph 116.

In order to implement the techniques described herein, the network embedding module 106 is configured to receive the graph data 310, as uploaded from the computing device 302, in the form of the heterogeneous graph 116. As described above with respect to FIG. 1, the network embedding module 106 is configured to traverse the heterogeneous graph 116 to determine a frequency of a typed graphlet 320, such as a frequency of a typed graphlet H in the heterogeneous graph 116. In some implementations, the network embedding module 106 is implemented to count the frequency of the typed graphlet for each of the edges in the heterogeneous graph 116, denoted by the node associations 124. In this manner, a node association of node associations 124 between two nodes in the graph is an edge (e.g., a pair of nodes i and j) and the typed graphlets that occur on every edge in the graph are counted.

The network embedding module 106 is further implemented by the server computing device 306 to derive the typed graphlet matrices 322 based on the frequency of the typed graphlet 320 in the heterogeneous graph 116. In some implementations, the typed graphlet matrices 322 are weighted based on the typed graphlet frequency 320. The network embedding module 106 can then determine the higher-order network embeddings 134 for each of the nodes 122 in the heterogeneous graph 116 using the typed graphlet matrices. The network embedding module 106 is then configured to concatenate the higher-order network embeddings 134 into a typed graphlet embedding matrix 136, which represents typed graphlet patterns of the subgraphs 120 of the network. The higher-order network embeddings 134 and/or the typed graphlet embedding matrix 136 can subsequently be communicated as feedback from the network system 304 to the computing device 302, as indicated at 324 in the network 308. A user of the computing device 302 can then run algorithms with their own graph data 310 and the received higher-order network embeddings 134.

In some implementations, the network embedding module 106 is implemented to determine a function that represents the mapping of the nodes 122 to d-dimensional features represented by the higher-order network embeddings 134. The network embedding module 106 can determine a network representation from machine learning applied to the higher-order network embeddings as further shown and described with reference to FIG. 4. The higher-order network embeddings capture the notion of structural similarity by using higher-order connectivity patterns explicitly in the learning process. Notably, the framework of higher-order network embedding also provides for prediction in extremely sparse data, and particularly for only a few observations, where the conventional techniques are unable to handle extremely sparse data.

In this example implementation, the graph data 310 is uploaded to the network system 304 and transformed into feature-based representations that reflect the structural properties in the heterogeneous graph 116, such as the representations provided by the higher-order network embeddings 134. In this manner, a machine learning algorithm may be run with the feature-based representations to build model representations of a complex, dynamic network.

For instance, the graph data 310 may represent a correlation of many different node types, such as user devices, their location (spatial information), the time of an associated event, IP, webpages visited, among other important characteristics. The data can be represented as a rich heterogeneous network where users connect to other users, users connect to webpages, geographical location, etc. A notable machine learning task is to be able to predict which devices belong to the same user, and associate those devices, which can significantly improve any downstream prediction tasks using the data. For instance, using higher-order network embedding to make these associations between devices improves the ability to accurately model user behavior, and may be used to identify which multiple devices belong to the same user, to make targeted recommendations with content relevant to particular users, to predict user-level actions, such as clicks on a webpage or advertisement, and so forth.

Additionally, for webpage analytics where web pages can be represented as graphs, the nodes are the web pages and the edges (e.g., node associations) are the hyperlinks between the web pages. In this manner, the network embedding module 106 can determine the relationships between various webpages, thereby providing new insight into webpage analytics. This benefit extends beyond webpages, as the techniques described herein are applicable to heterogeneous graph representations of any type of network. Thus, the higher-order network embeddings can be used to model the relationships of individual devices associated with users, as well as to determine the tasks performed by the devices. Segmenting the devices into group "clusterings" based on the determined user behavior, as represented in the graph, can also be used by various analytic applications. Further, aspects of higher-order network embedding can be used as a central component of a recommendation system, and the feature-based representations learned from higher-order network embedding can be directly used to make better recommendations, such as in photo applications, for user interests, and any other type of recommendations.

For example in the context of a link prediction problem, and given a partially observed heterogeneous graph G, the link prediction task is to predict the missing edges. Table 5 below describes three real-world heterogeneous graphs, and Table 6 describes the improvement provided by the techniques described herein relative to five conventional approaches for link prediction. Specifically, Table 6 evaluates the higher-order typed graphlet node embedding approach described above with respect to Algorithm 2 relative to the "DeepWalk" method (DW), the "LINE" method, the "GraRep" method (GR), spectral embedding using untyped edge motifs (Spec), and spectral embedding using untyped graphlets (GSpec). The performance of Algorithm 2 is included in the column of Table 6 labeled "TGS", and is evaluated against $F_1$, Precision, Recall, and AUC evaluation metrics.

TABLE 5

| Graph | $|\tau_V|$ | $|\tau_E|$ | Heterogeneous Edge Types |
|---|---|---|---|
| movielens | 3 | 3 | user-by-movie, user-by-tag tag-by-movie |
| dbpedia | 4 | 3 | person-by-work (produced work), person-has-occupation, work-by-genre (work-associated-genre) |
| yahoo-msg | 2 | 2 | user-by-user (communicated with), user-by-location (communication location) |

TABLE 6

|  |  | DW | LINE | GR | Spec | GSpec | TGS |
|---|---|---|---|---|---|---|---|
| movielens | $F_1$ | 0.8544 | 0.8638 | 0.8550 | 0.8774 | 0.8728 | 0.9409 |
|  | Prec. | 0.9136 | 0.8785 | 0.9235 | 0.9409 | 0.9454 | 0.9747 |
|  | Recall | 0.7844 | 0.8444 | 0.7760 | 0.8066 | 0.7930 | 0.9055 |
|  | AUC | 0.9406 | 0.9313 | 0.9310 | 0.9515 | 0.9564 | 0.9900 |
| dbpedia | $F_1$ | 0.8414 | 0.7242 | 0.7136 | 0.8366 | 0.8768 | 0.9640 |
|  | Prec. | 0.8215 | 0.7754 | 0.7060 | 0.7703 | 0.8209 | 0.9555 |
|  | Recall | 0.8726 | 0.6375 | 0.7323 | 0.9669 | 0.9665 | 0.9733 |
|  | AUC | 0.8852 | 0.8122 | 0.7375 | 0.9222 | 0.9414 | 0.9894 |
| yahoo | $F_1$ | 0.6927 | 0.6269 | 0.6949 | 0.9140 | 0.8410 | 0.9303 |
|  | Prec. | 0.7391 | 0.6360 | 0.7263 | 0.9346 | 0.8226 | 0.9432 |
|  | Recall | 0.5956 | 0.5933 | 0.6300 | 0.8904 | 0.8699 | 0.9158 |
|  | AUC | 0.7715 | 0.6745 | 0.7551 | 0.9709 | 0.9272 | 0.9827 |

Figure 4:
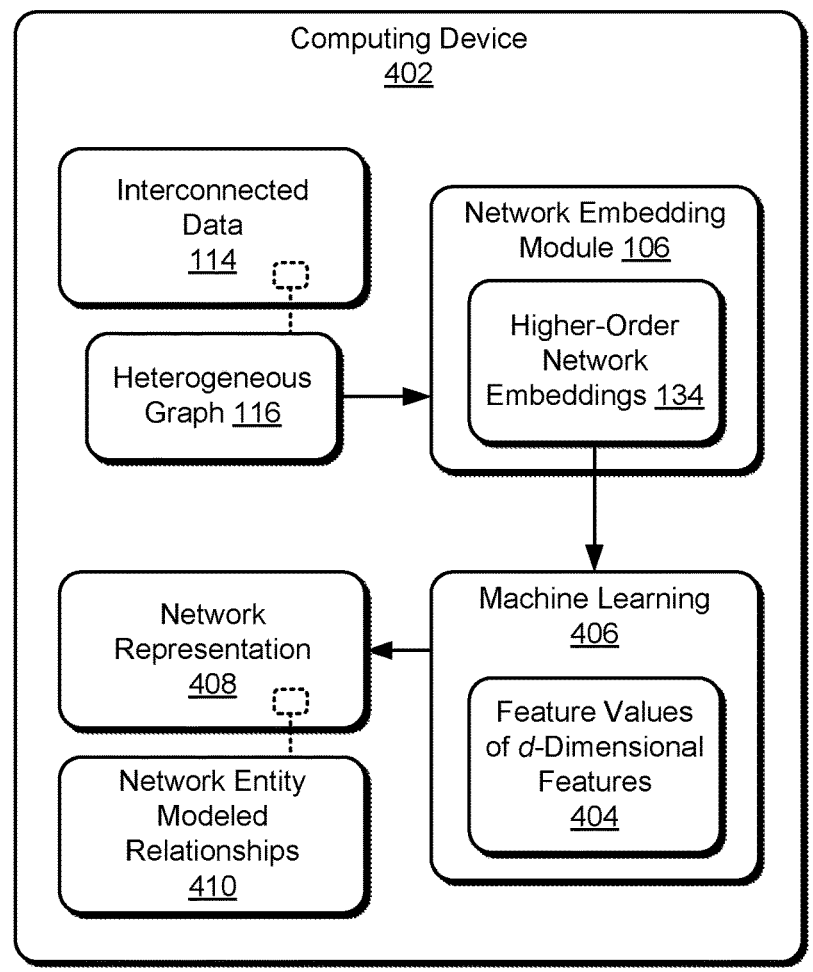
FIG. 4 illustrates another example environment in which a network embedding module of FIG. 1 performs higher-order network embedding using techniques described herein.

FIG. 4 illustrates an example environment 400 in which aspects of higher-order network embedding can be implemented using the techniques described herein. The example environment 400 includes a computing device 402, which implements features of the network embedding module 106 as shown and described with respect to FIGS. 1 and 3. The computing device 402 can be implemented as any type of computing device, such as the computing device 102 of FIG. 1 or the server computing device 306 of FIG. 3. In the illustrated example 400, the computing device 402 may be configured to include any number and combination of different components as described in further detail below with respect to FIG. 7.

As described above, the network embedding module 106 is implemented by the computing device 402 to determine the higher-order network embeddings 134 for the nodes of the heterogeneous graph 116. The higher-order network embeddings 134 for each of the respective nodes are representative of feature values 404 that describe the respective graph nodes. For instance, the heterogeneous graph 116 represents a network, and the feature values 404 are of d-dimensional features to which machine learning 406 can be applied to determine a network representation 408 of the network. For example, the network representations 408 can be generated as a network model by the machine learning 406, which then uses the network model to determine modeled relationships 410 of the network entities that are represented by the nodes of the heterogeneous graph 116. Generally, the higher-order network embeddings 134 are the features of the network nodes, and the network embedding module 106 is implemented to determine the higher-order network embedding 134 for each of the nodes in the heterogeneous graph 116. The machine learning 406 can receive the higher-order network embeddings 134, as generated by the network embedding module 106 shown and described with reference to FIGS. 1 and 3.

In this manner, the computing device 402 implements the machine learning 406, such as in software, in hardware, or as a combination of software and hardware components. The machine learning can be implemented as any type of a logistic regression or other machine learning model, such as a neural network, a support vector machine, and so forth. Thus, machine learning 406 is representative of a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, and the like. Thus, a machine-learning model makes high-level abstractions in data by generating data-driven predictions or decisions from the known input data.

Having discussed example details of the techniques for performing higher-order network clustering and embedding, consider now some example procedures to illustrate additional aspects of the techniques.

Example Procedures

The following discussion describes techniques that may be implemented utilizing the previously described systems and devices. Aspects of each of the procedures may be implemented in hardware, firmware, software, or a combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The procedures are shown as a set of blocks that specify operations performed by one or more devices and are not necessarily limited to the orders shown for performing the operations by the respective blocks. In portions of the following discussion, reference may be made to FIGS. 1-4.

Figure 5:
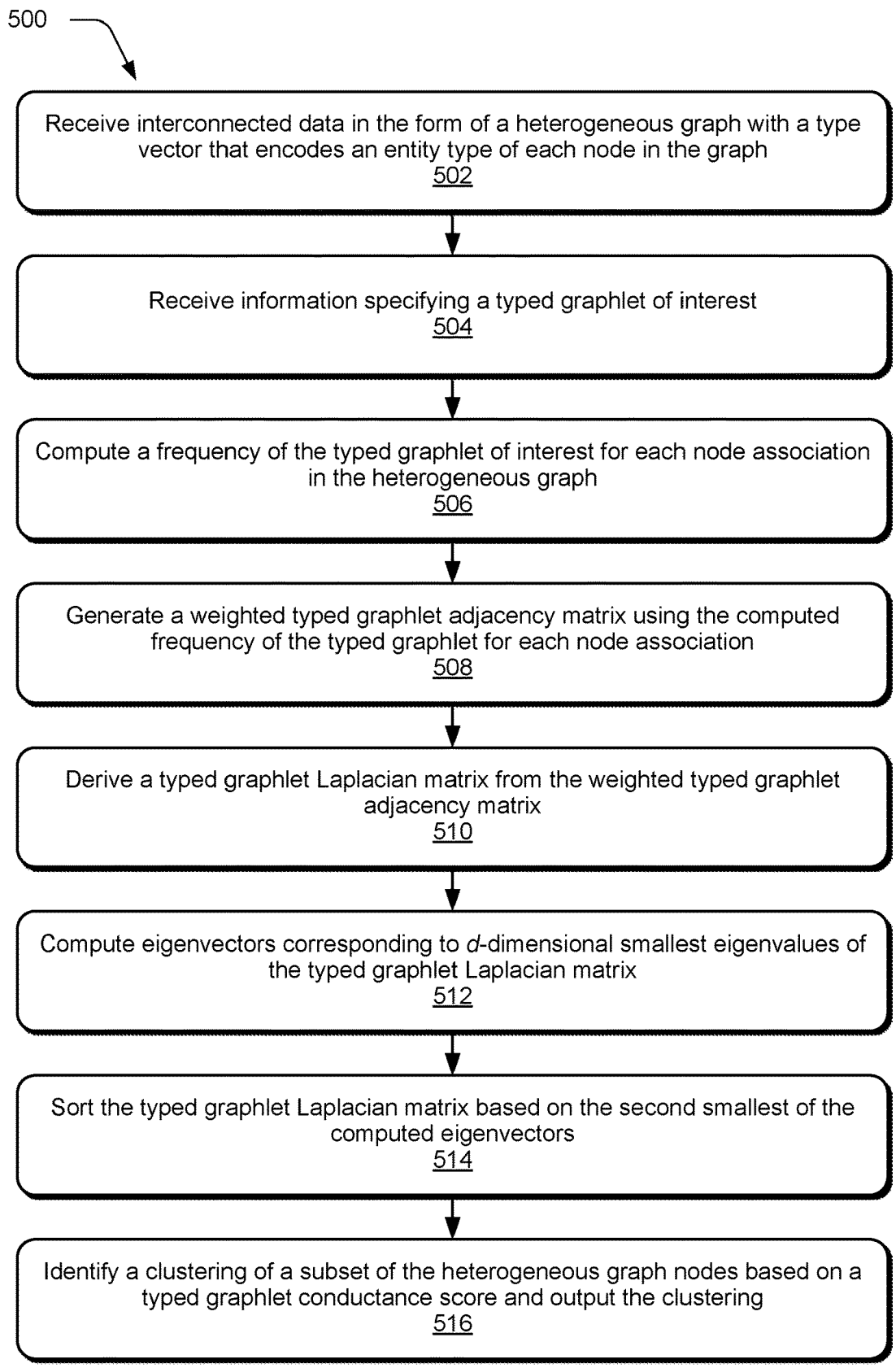
FIG. 5 is a flow diagram depicting a procedure in an example implementation for performing higher-order network clustering using the techniques described herein.

FIG. 5 depicts an example procedure 500 in an example implementation of generating a clustering for a network represented by a heterogeneous graph using the techniques described herein. Interconnected data in the form of a heterogeneous graph is received with a type vector that encodes an entity type of each node in the graph (block 502). For example, the network clustering module 104 implemented by the computing device 102 and/or the server computing device 206 receives the interconnected data 114 in the form of the heterogeneous graph 116 that represents a network with typed graphlets representing subgraphs 120 of the network. The heterogeneous graph 116 includes the nodes 122 that each represent an entity in the network, and also includes the node associations 124 that each represent an edge between two of the nodes 122 in the graph.

Information is then received specifying a typed graphlet of interest in the heterogeneous graph (block 504). For example, the network clustering module 104 receives the interconnected data with an indication of one or more typed graphlets 118 of interest in the heterogeneous graph 116. A frequency for of the typed graphlet of interest is then computed for each node association in the heterogeneous graph (block 506). For example, the network clustering module 104 traverses the nodes 122 in the heterogeneous graph 116 and counts a frequency of the typed graphlet 118 for each of the node associations 124 in the heterogeneous graph 116. As described herein, a node association between two nodes in the graph is an edge (e.g., a pair of nodes i and j) and the typed graphlets that occur on every edge in the graph are counted.

A weighted typed graphlet adjacency matrix is generated using the computed frequency of the typed graphlet for each node association (block 508). For example, the network clustering module 104 generates the typed graphlet adjacency matrix 220. In implementations, the typed graphlet adjacency matrix 220 is weighted based on the computed frequency of the typed graphlet and generated according to Equation 6, as described above with respect to FIG. 1. From the weighted typed graphlet adjacency matrix, a typed graphlet Laplacian matrix is derived (block 510). For example, the network clustering module derives the typed graphlet Laplacian matrix 222 from the typed graphlet adjacency matrix 220 according to Equation 7 as described above with respect to FIG. 1.

Eigenvectors corresponding to d-dimensional smallest eigenvalues of the typed graphlet Laplacian matrix are then computed (block 512). For example, the network clustering module 104 computes the eigenvectors of the typed graphlet Laplacian matrix 222. The typed graphlet Laplacian matrix is then sorted based on the second-smallest of the computed eigenvectors (block 514). For example, the network clustering module 104 sorts the typed graphlet Laplacian matrix 222 according to the eigenvector corresponding to its second-smallest eigenvalue to generate node orderings 128.

A clustering including a subset of nodes of the heterogeneous graph is then identified based on a typed graphlet conductance score and output (block 516). For example, the network clustering module 104 identifies and outputs clustering 130 based on a typed graphlet conductance for a fixed heterogeneous graph G and a typed graphlet H of G. The typed graphlet conductance for a fixed heterogeneous graph is defined according to Equation 4 as described above with respect to FIG. 1. In some implementations, the network clustering module 104 is configured to identify and output additional community clusters by removing the subset of nodes included in the clustering 130 and repeating the actions described by blocks 504 to 516.

Figure 6:
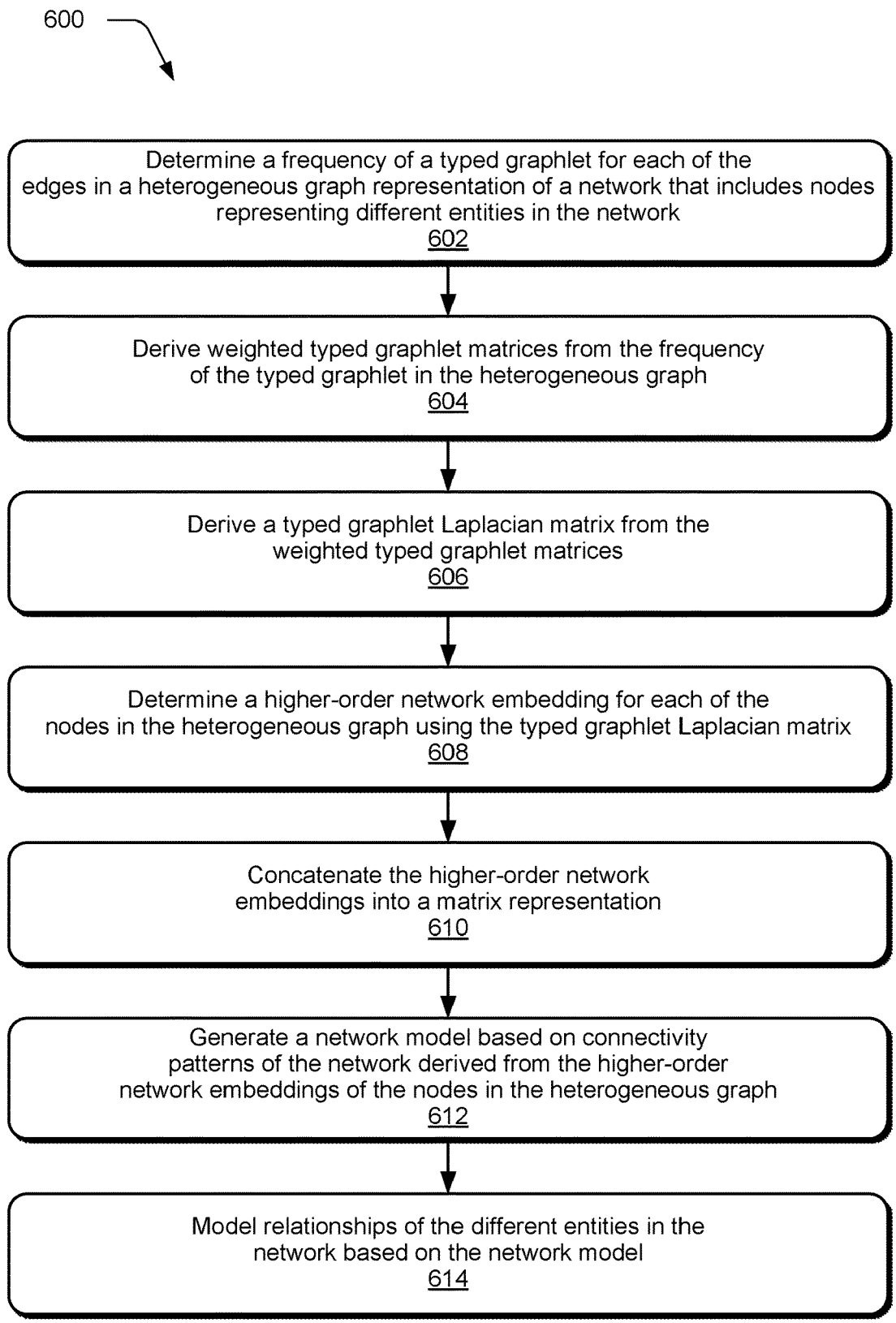
FIG. 6 is a flow diagram depicting a procedure in an example implementation for performing higher-order network embedding using the techniques described herein.

FIG. 6 depicts an example procedure 600 in an example implementation of higher-order network embedding using the techniques described herein. A frequency of a typed graphlet for each of the edges in a heterogeneous graph representation of a network that includes nodes representing different entities of the network is determined (block 602). For example, the network embedding module 106 implemented by the computing device 102 and/or the server computing device 306 receives the interconnected data 114 in the form of the heterogeneous graph 116 that represents a network with typed graphlets 118 representing subgraphs 120 of the network. The heterogeneous graph 116 includes the nodes 122 that each represent an entity in the network, and also includes the node associations 124 that each represent an edge between two of the nodes 122 in the graph. In implementations, the network embedding module 106 traverses the nodes 122 in the heterogeneous graph 116 and counts a frequency of the typed graphlet 118 for each of the node associations 124 in the heterogeneous graph 116 to output the frequency of the typed graphlet 320.

Weighted typed graphlet matrices are derived from the frequency of the typed graphlet in the heterogeneous graph (block 604). For example, the network embedding module 106 generates the typed graphlet matrices 322. In implementations, the typed graphlet matrices 322 are weighted based on the computed frequency of the typed graphlet and generated according to Equation 6, as described above with respect to FIG. 1. A typed graphlet Laplacian matrix is then derived from the weighted typed graphlet matrices (block 606). For example, the network embedding module 106 derives a typed graphlet Laplacian matrix from the typed graphlet matrices according to Equation 7 as described above with respect to FIG. 1.

A higher-order network embedding is then determined for each of the nodes in the heterogeneous graph using the typed graphlet Laplacian matrix (block 608). For example, the network embedding module 106 determines the higher-order network embeddings 134 for each of the nodes 122 in the heterogeneous graph 116 from typed graphlet matrices generated from the typed graphlet matrices 322. The higher-order network embeddings are then concatenated into a matrix representation (block 610). For example, the network embedding module 106 concatenates the higher-order network embeddings 134 into a typed graphlet embedding matrix 136.

A network model is generated based on connectivity patterns of the network derived from the higher-order network embeddings of the nodes in the heterogeneous graph (block 612). For example, the network embedding module 106 generates a network representation 408 from machine learning 406. In some implementations, the machine learning 406 generates a network model, such as the network representation 408, based on connectivity patterns of the network derived from the higher-order network embeddings 134 of the nodes 122 in the heterogeneous graph 116. Relationships of the different entities in the network are then modeled based on the network model (block 614). For example, the machine learning 406 models the relationships 410 of the different entities in the network based on the network representation 408. In some implementations, the machine learning 406 can model user behavior, which can then be utilized to make recommendations, predict user-level actions, recommend similar interests for a user, develop a device graph of user devices from which analytics can be leveraged for advertising, and any other type of relationships that may be modeled from a network representation.

Having described example procedures in accordance with one or more implementations, consider now an example system and device that can be utilized to implement the various techniques described herein.

Example System and Device

Figure 7:
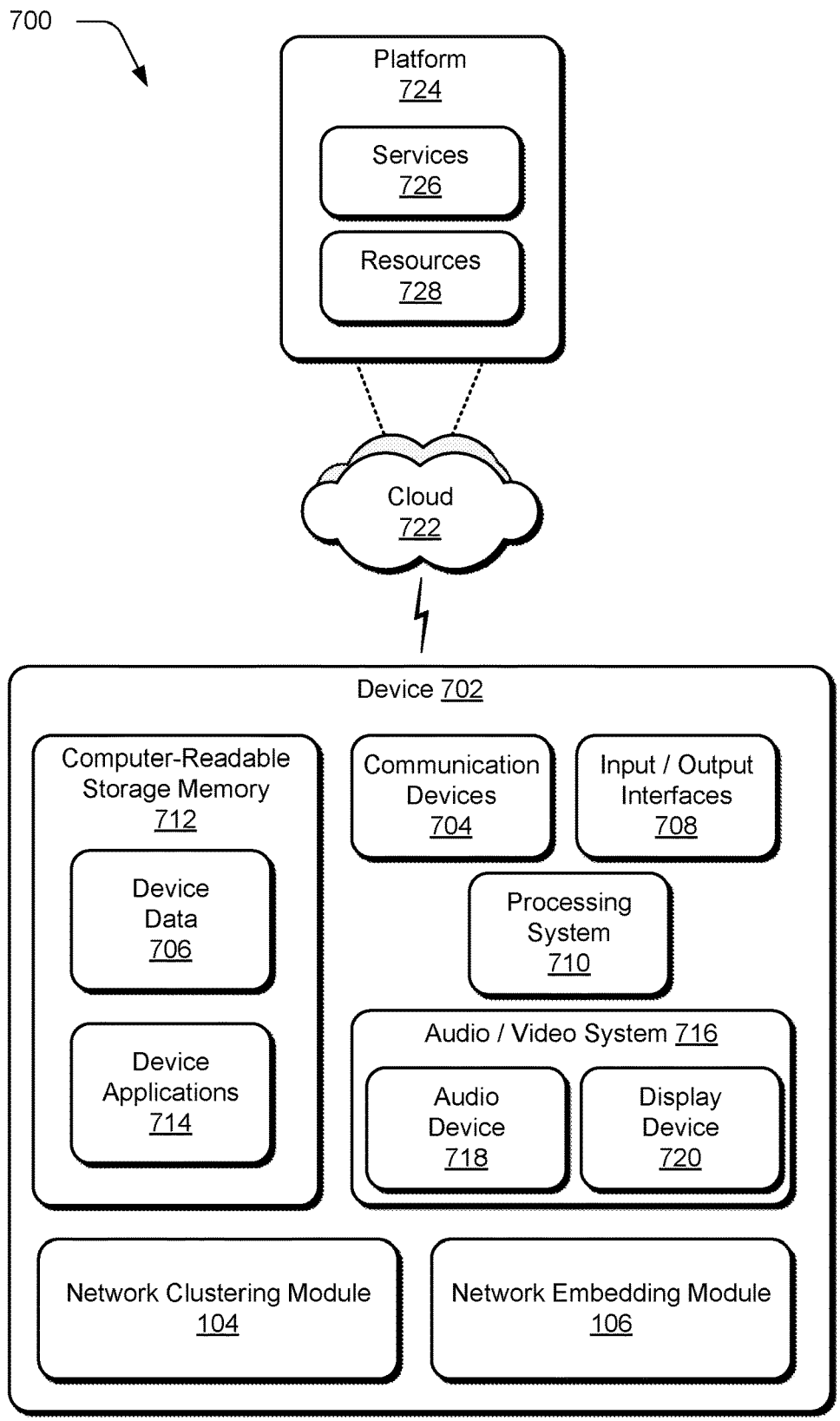
FIG. 7 illustrates an example system including various components of an example device that can be implemented as a computing device as described and/or utilized with reference to FIGS. 1-6 to implement the techniques described herein.

FIG. 7 illustrates an example system 700 that includes an example computing device 702 that is representative of one or more computing systems and/or devices that may implement the various techniques described herein. This is illustrated through inclusion of the network clustering module 104 and the network embedding module 106. The example device 702 can be implemented as any of the computing devices, mobile devices, server devices, and/or services described with reference to the previous FIGS. 1-6, such as any type of computing device, client device, mobile phone, tablet, communication, entertainment, gaming, media playback, and/or other type of device. For example, the computing device 102, the computing device 202, the computing device 302, the computing device 402, the server computing device 206, the server computing device 306, various server devices of the network system 204, and/or various server devices of the network system 304 may be implemented as the example device 702.

The example device 702 includes communication devices 704 that enable wired and/or wireless communication of device data 706, such as the interconnected data, the heterogeneous graph, the node data, the graph data, the higher-order network clusters, the higher-order network embeddings, and related data, as well as computer applications data and content that is transferred from one computing device to another, and/or synched between multiple computing devices. The device data 706 can include any type of audio, video, image, and/or graphic data that is generated by applications executing on the device. The communication devices 704 can also include transceivers for cellular phone communication and/or for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 702. The I/O interfaces also include data input ports via which any type of data, media content, and/or inputs can be received, such as user inputs to the device, as well as any type of audio, video, and/or image data received from any content and/or data source.

The device 702 includes a processing system 710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The example device 702 also includes computer-readable storage memory 712, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 712 can include various implementations of random access memory (RAM), read only memory (ROM), flash memory, and other types of storage memory in various memory device configurations.

The computer-readable storage memory 712 provides storage of the device data 706 and various device applications 714, such as an operating system that is maintained as a software application with the computer-readable storage memory and executed by the processing system 710. In this example, the device 702 includes network clustering module 104 and network embedding module 706, which are implemented to perform the techniques described herein, and may be implemented with hardware components and/or in software as one of the device applications 714. For instance, network clustering module 104 and network embedding module 106 may be implemented as one or more of the device applications 714 in an example scenario where the example device 702 is implemented as the computing device 102, as described with reference to FIGS. 1-6. In implementations, the network clustering module 104 and the network embedding module 706 may each include independent processing, memory, and logic components as a computing and/or electronic device integrated with the device 702.

The device 702 also includes an audio and/or video system 716 that generates audio data for an audio device 718 and/or generates display data for a display device 720. The audio device and/or the display device include any devices that process, display, and/or otherwise render audio, video, display, and/or image data. In implementations, the audio device and/or the display device are integrated components of the example device 702. Alternatively, the audio device and/or the display device are external, peripheral components to the example device. In embodiments, at least part of the techniques described for higher-order network clustering and embedding may be implemented in a distributed system, such as over a "cloud" 722 in a platform 724. The cloud 722 includes and/or is representative of the platform 724 for services 726 and/or resources 728. For example, the services 726 may include the network systems 204 and 304 described with reference to FIGS. 1-6.

The platform 724 abstracts underlying functionality of hardware, such as server devices (e.g., included in the services 726) and/or software resources (e.g., included as the resources 728), and connects the example device 702 with other devices, servers, etc. The resources 728 may also include applications and/or data that can be utilized while computer processing is executed on servers that are remote from the example device 702. Additionally, the services 726 and/or the resources 728 may facilitate subscriber network services, such as over the Internet, a cellular network, or Wi-Fi network. The platform 724 may also serve to abstract and scale resources to service a demand for the resources 728 that are implemented via the platform, such as in an interconnected device embodiment with functionality distributed throughout the system 700. For example, the functionality may be implemented in part at the example device 702 as well as via the platform 724 that abstracts the functionality of the cloud 722.

Although implementations of higher-order network clustering and embedding have been described in language specific to features and/or methods, the appended claims are not necessarily limited to the specific features or methods described. Rather, the specific features and methods are disclosed as example implementations of higher-order network clustering and embedding, and other equivalent features and methods are intended to be within the scope of the appended claims. Further, various different examples are described and it is to be appreciated that each described example can be implemented independently or in connection with one or more other described examples.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for higher-order heterogeneous network clustering, a method implemented by at least one computing device, the method comprising:
   receiving interconnected data in the form of a heterogeneous graph that represents a network, the heterogeneous graph including:

hundreds of nodes that each represent one of a plurality of entities in the network, the plurality of entities comprising at least two of digital content items, users physical locations, or events; and node associations that each represent an edge between two of the nodes in the heterogeneous graph;

deriving typed graphlet adjacency matrices weighted by a typed graphlet frequency for each of a plurality of typed graphlets in the heterogeneous graph;

generating a typed graphlet Laplacian matrix for one of the plurality of typed graphlets using the typed graphlet adjacency matrix for the one of the plurality of typed graphlets;

determining a node ordering for the nodes of the heterogeneous graph using the typed graphlet Laplacian matrix;

generating a clustering of the heterogeneous graph using the node ordering, the clustering including a subset of the hundreds of nodes; and communicating digital content to a subset of the plurality of entities that are represented by the subset of the hundreds of nodes.

2. The method as recited in claim 1, wherein the interconnected data includes a type vector that encodes, for each of the hundreds of nodes in the heterogeneous graph, an entity type for the corresponding one of the plurality of entities represented by the node and specifies the one of the plurality of typed graphlets.

3. The method as recited in claim 1, wherein deriving the typed graphlet adjacency matrices comprises computing the typed graphlet frequency for each of the plurality of typed graphlets for every edge in the heterogeneous graph.

4. The method as recited in claim 1, further comprising removing the subset of nodes from the heterogeneous graph and generating a different clustering by analyzing the heterogeneous graph without the subset of nodes.

5. The method as recited in claim 1, further comprising identifying a plurality of clusters within the heterogeneous graph using the node ordering and determining a typed graphlet conductance score for each of the plurality of clusters, wherein the clustering of the heterogeneous graph is selected from the plurality of clusters based on its typed graphlet conductance score.

6. The method as recited in claim 1, wherein determining the node ordering for the nodes of the heterogeneous graph comprises computing eigenvectors corresponding to d-dimensional smallest eigenvalues of the typed graphlet Laplacian matrix.

7. In a digital medium environment for higher-order network embedding, a method implemented by at least one computing device, the method comprising:

receiving interconnected data in the form of a heterogeneous graph that represents a network, the heterogeneous graph including hundreds of nodes that each represent one of a plurality of entities in the network and node associations that each represent an edge between two of the nodes in the heterogeneous graph;

determining a frequency of a typed graphlet for each of the edges in the heterogeneous graph;

deriving a typed graphlet matrix from the frequency of the typed graphlet in the heterogeneous graph;

determining a higher-order network embedding for each of the nodes in the heterogeneous graph from the typed graphlet matrix;

generating a clustering of a subset of the hundreds of nodes using the higher-order network embeddings; and outputting digital content to the of nodes without outputting the digital content to other nodes of the hundreds of nodes that are excluded from the subset.

8. The method as recited in claim 7, wherein the nodes of the heterogeneous graph include at least a first node representing a first entity type of the plurality of entities and a second node representing a second entity type of the plurality of entities that is different from the first entity type and the node associations of the heterogeneous graph include at least a first node association representing a first edge type and a second node association representing a second edge type that is different from the first edge type.

9. The method as recited in claim 7, wherein the typed graphlet matrix is weighted based on the frequency of the typed graphlet for each of the edges in the heterogeneous graph.

10. The method as recited in claim 7, wherein deriving the typed graphlet matrix comprises assigning a zero value for each edge in the heterogeneous graph that does not include the typed graphlet.

11. The method as recited in claim 7, further comprising computing a normalized Laplacian matrix of the typed graphlet matrix, computing a second smallest eigenvector of the normalized Laplacian matrix, and sorting the normalized Laplacian matrix using the second smallest eigenvector, wherein generating the clustering of the subset of nodes is based on the sorted normalized Laplacian matrix.

12. The method as recited in claim 7, wherein the heterogeneous graph is a directed heterogeneous graph where each edge is defined as being directed from one node to another, and wherein the typed graphlet is a directed typed graphlet.

13. A computing device implemented for higher-order network embedding in a digital medium environment, the computing device comprising:

a memory to maintain interconnected data in the form of a heterogeneous graph that represents a network, the heterogeneous graph including hundreds of nodes that each represent one of a plurality of entities in the network and node associations that each represent an edge between two of the nodes in the heterogeneous graph; and a processor system configured to execute a network embedding module configured to:
determine a frequency of typed graphlets for each of the edges in the heterogeneous graph;
derive typed graphlet matrices from the frequency of each of the typed graphlets in the heterogeneous graph;
determine a higher-order network embedding for each of the nodes in the heterogeneous graph from each of the typed graphlet matrices;
generate a typed graphlet embedding matrix that represents the network using the higher-order network embeddings;
apply machine learning to model relationships of the entities in the network based on the typed graphlet embedding matrix and generate a plurality of clusterings based on the modeled relationships, each of the plurality of clusterings including a subset of the hundreds of nodes; and
communicating digital content to the subset of nodes included in one of the plurality of clusterings.

14. The computing device as recited in claim 13, the network embedding module further configured to:
derive higher-order network embeddings between nodes of the heterogeneous graph that are known to match and train a machine learning model using the nodes that are known to match as positive training examples; and derive higher-order network embeddings between nodes of the heterogeneous graph that are known to not match and train the machine learning model using the nodes that are known to not match as negative training examples, wherein the processor system is configured to apply the trained machine learning model to model the relationships of the entities and generate the plurality of clusterings.

15. The computing device as recited in claim 13, wherein the typed graphlets comprise a temporal typed graphlet that includes information describing a time at which at least one of the edges was established.

16. The computing device as recited in claim 13, wherein the typed graphlets comprise at least one of a typed motif, a typed induced subgraph, a heterogeneous network motif, a colored motif, or a colored induced subgraph.

17. The computing device as recited in claim 13, wherein applying the machine learning comprises applying a machine learning model to determine a probability that indicates whether two or more nodes in the heterogeneous graph should be linked.

18. The computing device as recited in claim 17, wherein a first node of the two or more nodes corresponds to a user entity, a second node of the two or more nodes corresponds to a different user entity or a content item, and the probability that indicates whether the two or more nodes in the heterogeneous graph should be linked comprises indicates a degree of relevance between the user entity and the different user entity or the content item.

19. The computing device as recited in claim 13, wherein the node associations of the heterogeneous graph include at least a first node association representing a first edge type and a second node association representing a second edge type that is different from the first edge type.

20. The computing device as recited in claim 13, wherein the heterogeneous graph is a directed heterogeneous graph that includes a direction for each of the node associations and wherein each of the typed graphlets is a directed typed graphlet.

* * * * *